US008763902B2

(12) United States Patent
Silbernagl

(10) Patent No.: US 8,763,902 B2
(45) Date of Patent: Jul. 1, 2014

(54) MASS TRANSIT FARE PROCESSING SYSTEM

(75) Inventor: Martin Friedrich Ludwig Silbernagl, Berlin (DE)

(73) Assignee: Smart Systems Innovations, LLC, New York, NY (US)

( * ) Notice: Subject to any disclaimer, the term of this patent is extended or adjusted under 35 U.S.C. 154(b) by 0 days.

(21) Appl. No.: 13/469,065

(22) Filed: May 10, 2012

(65) Prior Publication Data

US 2012/0255994 A1 Oct. 11, 2012

Related U.S. Application Data

(63) Continuation-in-part of application No. 12/511,037, filed on Jul. 28, 2009, now Pat. No. 8,281,990, which is a continuation-in-part of application No. 11/838,499, filed on Aug. 14, 2007, now Pat. No. 7,566,003, which is a continuation-in-part of application No. 11/668,456, filed on Jan. 29, 2007, now Pat. No. 7,568,617.

(60) Provisional application No. 61/484,219, filed on May 10, 2011, provisional application No. 60/869,112, filed on Dec. 7, 2006.

(51) Int. Cl.
*G06K 5/00* (2006.01)

(52) U.S. Cl.
USPC ......... 235/382; 235/375; 235/380; 235/382.5

(58) Field of Classification Search
USPC ...................................... 235/375, 380–382.5
See application file for complete search history.

(56) References Cited

U.S. PATENT DOCUMENTS

| | | | |
|---|---|---|---|
| 3,438,489 | A | 4/1969 | Cambornac et al. |
| 4,654,658 | A | 3/1987 | Walton |
| 4,899,036 | A | 2/1990 | McCrindle et al. |
| 5,053,774 | A | 10/1991 | Schuermann et al. |
| 5,103,079 | A | 4/1992 | Barakai et al. |
| 5,191,193 | A | 3/1993 | Le Roux |
| 5,286,955 | A | 2/1994 | Klosa |

(Continued)

FOREIGN PATENT DOCUMENTS

| | | |
|---|---|---|
| EP | 0 254 595 B1 | 5/1994 |
| GB | 2 267 626 A | 12/1993 |

(Continued)

OTHER PUBLICATIONS

Andara, Lael D., Ropers, Majeski, Kohn & Bentley, "Request for Ex Parte Reexamination of U.S. Patent No. 5,828,044", dated Aug. 23, 2007, 23 pages, Redwood City, California.

(Continued)

*Primary Examiner* — Tuyen K Vo
(74) *Attorney, Agent, or Firm* — Silicon Valley Patent Group LLP

(57) ABSTRACT

An implementation of a system and method for using existing identification token infrastructures for mass transit fare product entitlement and payment is provided. The system and method make use of tokens—usually issued by a third party—for identification purposes and optionally for settlement purposes. The system does not store information on the tokens and instead maintains access control data (i.e., "white" and "black" lists). This implementation differs from known systems that require specially issued credit cards that have dedicated mass transit functionality.

6 Claims, 26 Drawing Sheets

(56) References Cited

U.S. PATENT DOCUMENTS

| | | | | |
|---|---|---|---|---|
| 5,337,063 | A | 8/1994 | Takahira | |
| 5,396,558 | A | 3/1995 | Ishiguro et al. | |
| 5,449,894 | A | 9/1995 | Bruhnke et al. | |
| 5,479,172 | A | 12/1995 | Smith et al. | |
| 5,504,321 | A | 4/1996 | Sheldon | |
| 5,828,044 | A | 10/1998 | Jun et al. | |
| 6,018,717 | A | 1/2000 | Lee et al. | |
| 6,394,341 | B1 | 5/2002 | Makipaa et al. | |
| 6,480,101 | B1 | 11/2002 | Kelly et al. | |
| 6,648,222 | B2 | 11/2003 | McDonald et al. | |
| 6,732,922 | B2 | 5/2004 | Lindgren et al. | |
| 6,736,317 | B1 | 5/2004 | McDonald et al. | |
| 6,910,628 | B1 | 6/2005 | Sehr | |
| 7,566,003 | B2 | 7/2009 | Silbernagl | |
| 7,568,617 | B2 | 8/2009 | Silbernagl | |
| 7,957,871 | B1 * | 6/2011 | Echeruo | 701/54 |
| 8,281,990 | B2 | 10/2012 | Silbernagl | |
| 2002/0029165 | A1 * | 3/2002 | Takatori et al. | 705/13 |
| 2002/0161729 | A1 | 10/2002 | Andrews | |
| 2002/0174013 | A1 | 11/2002 | Freeman et al. | |
| 2003/0088777 | A1 | 5/2003 | Bae et al. | |
| 2005/0216405 | A1 | 9/2005 | So | |
| 2006/0278704 | A1 | 12/2006 | Saunders et al. | |
| 2008/0033880 | A1 | 2/2008 | Fiebiger et al. | |
| 2008/0156873 | A1 | 7/2008 | Wilhelm et al. | |
| 2008/0203152 | A1 * | 8/2008 | Hammad et al. | 235/380 |
| 2009/0171682 | A1 * | 7/2009 | Dixon et al. | 705/1 |
| 2009/0239512 | A1 * | 9/2009 | Hammad et al. | 455/414.1 |
| 2011/0165836 | A1 * | 7/2011 | Dixon et al. | 455/41.1 |
| 2012/0296710 | A1 * | 11/2012 | Dixon et al. | 705/13 |

FOREIGN PATENT DOCUMENTS

| | | | |
|---|---|---|---|
| WO | 94/22115 | A1 | 9/1994 |
| WO | 97/00501 | A1 | 1/1997 |
| WO | 2006/124808 | A2 | 11/2006 |
| WO | 2007/090027 | A2 | 8/2007 |

OTHER PUBLICATIONS

Andara, Lael D., Ropers, Majeski, Kohn & Bentley, "Exhibit D—Invalidity Claim Chart for U.S. Patent No. 5,828,044", not dated, 17 pages, Redwood City, California.

Bistrich, Austrian Patent Office, International Search Report for International Application No. PCT/KR96/00061, dated Jul. 29, 1996, 6 pages, Vienna, Austria.

"Hashing Credit Card Numbers" by Integrigy, Feb. 27, 2007 (16 pages).

"Hash function" by Wikipedia, downloaded from http://en.wikipedia.org/wiki/Hash_function on May 21, 2009 (9 pages).

"Payment Card Industry (PCI) Data Security Standard (DSS) and Payment Application Data Security Standard (PA-DSS) Glossary", Ver. 1.2, Oct. 2008 [see p. 6 "Hashing"] (14 pages).

"Query data faster using sorted hash clusters" by Scott Stephens, Jul. 27, 2005, downloaded May 21, 2009 (1 page).

"Skiers now can pay for bus ride with a 'blink'" by Nicole Warburton of Deseret Morning News, Dec. 7, 2006 (2 pages).

"ISO/IEC 4909: Identification cards—Financial transaction cards—Magnetic stripe data content for track 3", First edition, Jul. 1, 2006 (21 pages).

"ISO/IEC 7812-1: Identification cards—Identification of issuers—Part 1: Numbering system", Second edition, Sep. 15, 2000 (11 pages).

"ISO/IEC 7813: Information technology—Identification cards—Financial transaction cards", Sixth edition, Jul. 1, 2006 (12 pages).

"ISO/IEC 7816-4: Identification cards—Integrated circuit cards—Part 4: Organization, security and commands for interchange", Second edition, Jan. 15, 2005 (90 pages).

"ISO/IEC 7816-5: Identification cards—Integrated circuit cards—Part 5: Registration of application providers", Second edition, Dec. 1, 2004 (13 pages).

"ISO/IEC 7816-6: Identification cards—Integrated circuit cards—Part 6: Interindustry data elements for interchange" Second edition May 15, 2004 (26 pages).

"Contactless Payments Powered by MasterCard PayPass®" downloaded from http://www.mastercard.com/us/paypass/subway/about/contactless.html on Oct. 26, 2006, 1 page.

"MasterCard and Citi Conduct Consumer Trial of Contactless Payments with MTA in Select NYC Subway Stations" downloaded from http://www.mastercard.com/us/paypass/subway/about/subwaytrial_newsrelease_30 Jan. 20 . . . on Oct. 26, 2006, 2 pages.

"Turnstile. Turbostyle. Speed through with a tap." downloaded from http://www.mastercard.com/us/paypass/subway/index.html on Oct. 26, 2006, 1 page.

"Subway Fares Overview; The NYC Subway Trial Fare Options Using Contactless Payments" downloaded from http://www.mastercard.com/us/paypass/subway/faresoverview/index.html on Oct. 10, 2006, 1 page.

"Account Linked Payment Service Concept White Paper," Final Draft Version 1.0, American Public Transportation Association, Fare Systems and Programs Committee, Technologies Subcommittee, Aug. 4, 2005 (33 pages).

* cited by examiner

FIG. 3
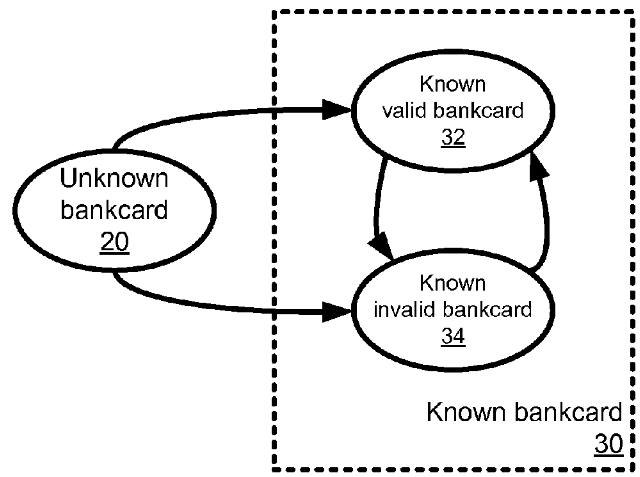
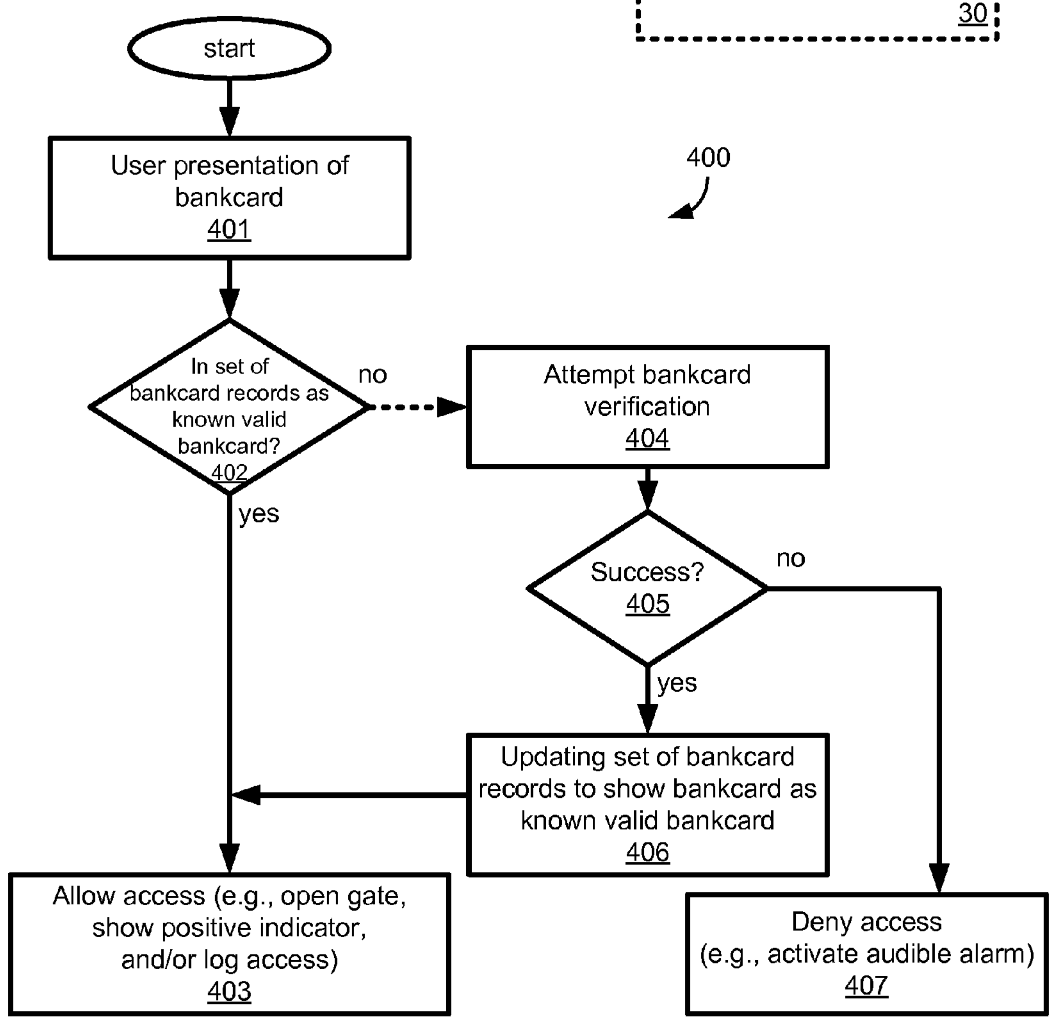
FIG. 4

First option: Check all unknown bankcards (e.g., first transit system access)

Second option: Allow all unknown bankcards at proxy

Third option: Allow all unknown bankcards at fare processor

Known token with pass account
(e.g., time pass or multiple rides)

Known token with pass account
(e.g., time pass or multiple rides)

Authorize transfers

First option: allow unknown bankcard on lost connection or timeout between fare processing system 300 and bankcard verification proxy 610

First option: block unknown bankcard on lost connection or timeout between fare processing system 300 and bankcard verification proxy 610

Clear & settle bankcard(s) with outstanding balance

Register token(s)/bankcard(s) for pass (e.g., time pass or multiple rides)

MASS TRANSIT FARE PROCESSING SYSTEM

CROSS-REFERENCE TO RELATED APPLICATIONS

This application claims the benefit under 35 U.S.C. 119(e) of U.S. Provisional Application 61/484,219, entitled "Mass Transit Fare Processing System" and filed May 10, 2011, which is incorporated herein by reference and assigned to the same assignee as the present application. This application is also a continuation-in-part and claims the benefit under 35 U.S.C. 120 of co-pending U.S. application Ser. No. 12/511,037, entitled "Public transit system fare processor for transfers" and filed Jul. 28, 2009, which is a continuation-in-part of U.S. Pat. No. 7,566,003 (application Ser. No. 11/838,499 entitled "Learning Fare Collection System for Mass Transit" filed Aug. 14, 2007, and a continuation-in-part of U.S. Pat. No. 7,568,617 (application Ser. No. 11/668,456 also entitled "Learning Fare Collection System for Mass Transit" filed Jan. 29, 2007, which each claims the benefit under 35 U.S.C. 119(e) from U.S. Provisional Application 60/869,112, filed Dec. 7, 2006, each of which are incorporated herein by reference and assigned to the same assignee as the present application.

BACKGROUND OF THE INVENTION

1. Field of the Invention

The invention relates generally to public transit system access and more specifically to enabling a full set of mass-transit fare-products without the need to store information on the identification tokens.

2. Background of the Invention

Fare collection in mass transit has traditionally relied on mass transit agencies issuing scrip. A "scrip ticket" is used to describe paper money being used for, e.g., mass transit rides in lieu of taking money at those rides. Originally in tangible form like coinage, the same system was later translated to the electronic domain as a "virtual scrip." The virtual scrip was first stored in magnetic memory, later in electrical memory, sometimes connected to a microprocessor, such as in the case of so called smart cards.

The advent of virtual scrip brought with it the use of the storage medium to store not just scrip or a currency balance, but to store entitlement on the storage medium (in which case it may be called "fare media"). Such an entitlement might be the right to ride free of charge, or free of additional charge, for a specified time (e.g., a monthly pass), or the right to a reduced fare (e.g. a senior citizen pass).

However, such electronic fare media comes at a significant financial cost for transit agencies; not only is production and issuance of virtual scrip and other fare media very expensive, fraud risk is an additional burden in this model.

Independently of the above development, the recent years have brought the ubiquity contactless credit cards and contactless debit cards, as well as first attempts of implementing wireless payment or identification protocols using mobile phones.

A need thus exists to enable mass transit agencies to give up issuing fare media and make use of existing semi-public infrastructures of identification tokens, such as the credit and debit card networks, where issuers take on the cost of production, issuance and where the networks take on much of the fraud risk.

SUMMARY

An implementation of a system and method for using existing identification token infrastructures for mass transit fare product entitlement and payment is provided. The system and method make use of tokens—usually issued by a third party—for identification purposes and optionally for settlement purposes. The system does not store information on the tokens and instead maintains access control data (i.e., "white" and "black" lists). This implementation differs from known systems that require specially issued credit cards that have dedicated mass transit functionality.

Embodiments of the present invention include a fare processor (a transit system rules processor) to maintain access control lists and account for and settle fare payments.

Some embodiments of the present invention provide for a fare processor, the fare processor comprising: at least one processor; a first interface coupled to the at least one processor and coupled to receive a plurality of presentation records from the at least one public transit system; memory coupled to the at least one processor, wherein the memory is configured to hold the received plurality of presentation records; fare rules; and transit account data comprising an account state for a plurality of transit accounts; and a second interface coupled to the at least one processor and coupled to communicate to a payment gateway to settle the plurality of transit accounts; wherein the at least one processor is configured to apply the fare rules to the received plurality of presentation records.

Some embodiments of the present invention provide for a method for gating entry into a first transit system, the method comprising: receiving a set of records, wherein each of the records includes an index representative of an individual token, and wherein the set of records includes a set of records representing black-listed tokens wherein a black-listed token will be denied access to the first transit system; sequentially reading, at a token terminal, and processing token data from a plurality of tokens, wherein a first token of the plurality of tokens is issued by a first issuer and a second token of the plurality of tokens is issued by a second issuer separate and distinct from the first issuer, and wherein the first and second issuers are separate from the first transit system; processing a third token comprising: (a) reading, at the token terminal, token data from the third token; (b) determining an index representative of the third token; (c) searching for the index representative of the third token in the set of records to determine a status of the third token; (d) setting the status of the third token to indicate the third token is an unknown token; and (e) allowing access into the first transit system and entering, to a transaction history database, an indication of access into the first transit system by a holder of the third token; providing, to a processing system, entries from the transaction history database for remote determination of a transaction amount for each entry; and receiving an update to the set of records.

Some embodiments of the present invention provide for a method for authorizing a bankcard transaction, the method comprising: downloading two sets of records, each record comprising at least a bankcard identifier, the first set representing known invalid bankcards, the second set representing known valid bankcards, receiving a first authorization request, referencing a first bankcard checking if the first bankcard matches a known invalid card denying the first authorization request, if the first bankcard matches a known invalid card receiving a second authorization request, referencing a second bankcard, the request comprising at least the identifier of a second bankcard checking if the second bankcard matches a known invalid card checking if the second bankcard matches a known valid card approving the second authorization request, if the first bankcard does not match any known invalid cards, and matches a known valid card.

Some embodiments of the present invention provide for a method for controlling access to a transit network by maintaining a black list of identifying tokens, the method comprising: granting a potential rider access to a transit system upon presentation of an identifying token, comprising: reading a first set of token data from a first identifying token using a token reader; computing a first token identifier from the token data; checking the first token against a black list in memory, using the first token identifier; and allowing access to the transit network, if the first token is not black listed; denying a potential rider access to the transit system upon presentation of an identifying token, comprising reading a second set of token data from a second identifying token, using a token reader; computing a second token identifier from the token data; checking the second token against a black list in memory, using the second token identifier; and denying access to the transit network, if the second token is black listed; removing a third identifying token from the black list after its outstanding balance is paid, comprising: successfully charging a payment account associated with the third identifying token; and removing the third user token from the black list; and adding a fourth identifying token to the black list if the outstanding balance remains unpaid, comprising: unsuccessfully charging one or more a payment accounts associated with the fourth identifying token; and adding the fourth identifying token to the black list.

Some embodiments of the present invention provide for a fare processing system associated with a set of public transit systems, the processing system comprising: a first interface to receive a plurality of presentation records from at least one of the set of public transit systems record memory to hold received presentation records rule memory to hold fare rules account memory to store the state of one or more transit accounts a second interface connected to a payment gateway to settle the one or more transit accounts one or more processors, coupled to the first and second interfaces and to the record memory, rule memory and account memory, to apply the fare rules held in the rule memory to the presentations records held in the presentation record memory.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

FIG. 3 illustrates a state diagram, in accordance with embodiments of the present invention.

FIG. 4 represents a flowchart implementation for operations in a bankcard terminal 200, in accordance with embodiments of the present invention.

DETAILED DESCRIPTION OF THE INVENTION

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

Hereinafter, a bankcard, such as a credit card or a debit card, is a payment token that may be linked to a bank account or credit line. Bankcards include cards and tokens in any of a number of form factors. A bankcard may be dimensioned in accordance with ISO 7810/7813 ID1 (about 3.375"×2.125"×0.0030", commonly known as "Credit Card Format"). Alternatively, a bankcard may take other forms. A bankcard may take the form of a key fob (e.g., as issued by Speedpass™) or wristband. Alternatively, the bankcard may be embedded into, integrated with or be emulated by a mobile phone or other handheld device. A bankcard includes memory to hold an identifier used to uniquely identify an account for billing. The memory may be in the form of a magnetic stripe and/or may be attached to circuitry, which may be in accordance to ISO 7816. A bankcard may include or be integrated with contactless circuitry, such as ISO 14443. In some embodiments, a bankcard includes a token issued by a third party that is not a transit agency, such as a bank, credit union, a government agency (issuing a state driver's license or DMV issued identification card, federal government issued passport and/or other government issued ID).

Hereinafter, a user token, such a bankcard or government ID, is something that allows a rider to be identify with a certainty that is sufficient for mass transit fare collection. In some embodiments of the invention, a token is not limited to physical devices, but is intangible, such as a biometric trait.

Figure 1:
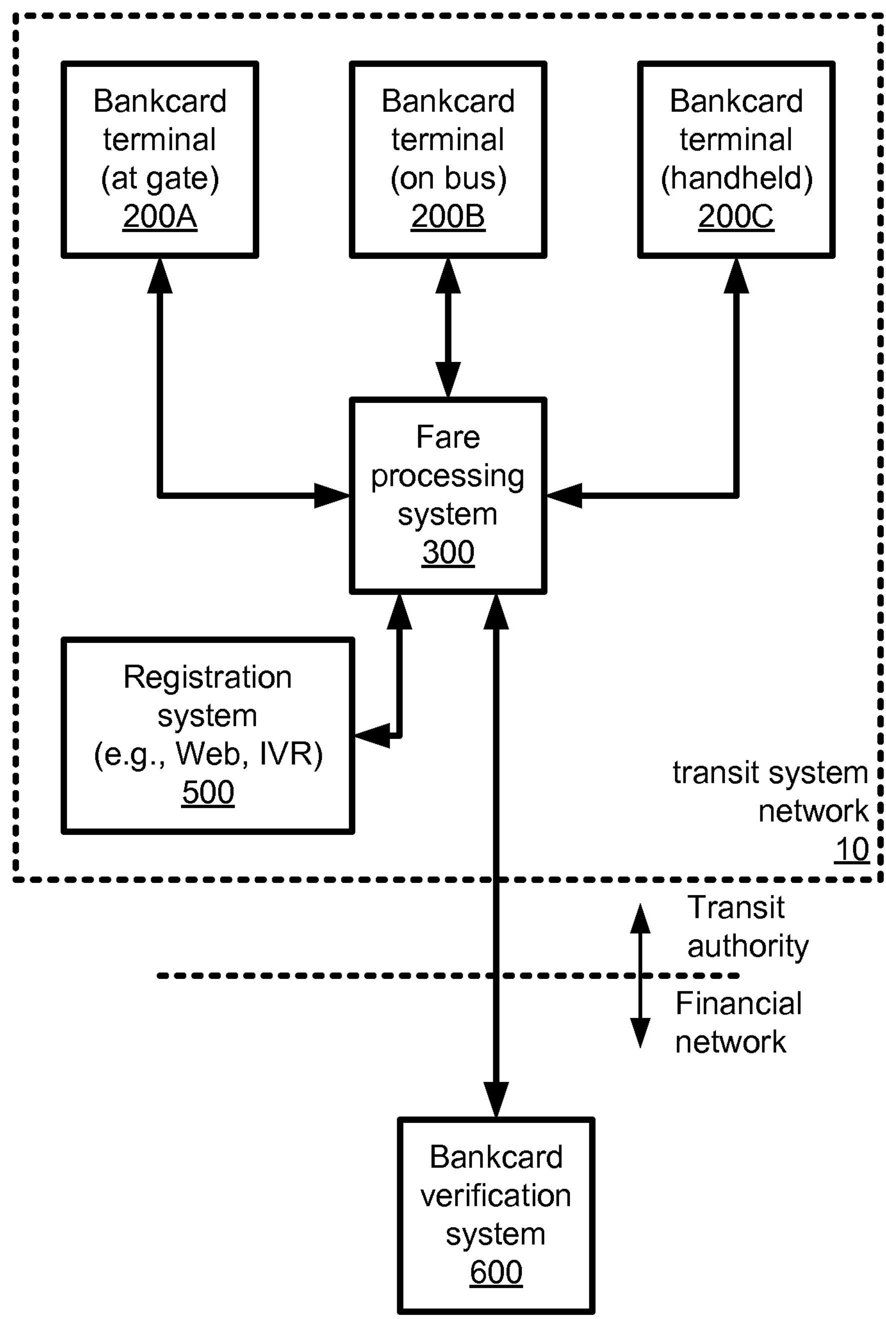
FIG. 1 shows a transit system network 10 with an associated fare processing system 300 (also called a fare processor or transit system rules processor) and various components in accordance with the present invention.

FIG. 1 shows a transit system network 10 with an associated fare processing system 300 (also called a fare processor or transit system rules processor) and various components in accordance with the present invention. Transit System network 10 includes bankcard terminals 200. Bankcard terminals 200 provide a front-end interface to bankcards. A bankcard terminal 200A may take the form of a turnstile at a gate in a subway or heavy rail system. Alternatively, a bankcard terminal 200A may be used on a transit system incorporating a self-policing or honor system (i.e., a passenger may enter into the transit system without being physically gated by a turnstile; the passenger voluntarily provides his or her bankcard to the to the bankcard terminal 200A; in this case, gating may simply be provided by an audible and/or visible indicator, whether or not the passenger has the right to enter). A bankcard terminal 200B may be integrated into a bill or coin collection terminal (often called a fare box) on a bus. A bankcard terminal 200C may be a handheld device used by a conductor in a train, to collect payment and/or to validate the previous purchase of a fare product. Collecting information from each of the bankcard terminals 200 is a fare processing system 300. Fare processing system 300 may interface to a bankcard terminal via a wired connection or a wireless connection. The interface may provide a constant connection, such as a dedicated communication line between a turnstile at a gate and a fare processing system 300. Alternatively, the interface may provide an intermittent connection, such as a wireless connection. In some cases, a connection between a bankcard terminal 200 and a fare processing system 300 may be made after a long period of service. For example, at the end of a day, the connection may be made between a bankcard terminal 200B in a bus when the bus retires to the garage, or when a handheld bankcard terminal 200C is brought back to the station.

Fare processing system 300 may also include one or more interface to a registration system 500. Registration system 500 provides a back-end interface to bankcards. A bankcard holder may register a bankcard with fare processing system 300 via a website, using an interactive voice response system (IVR), at an interactive electronic kiosk, or using a vending machine by supplying registration data either manually and/or by enabling the registration system 500 to read registration data from the bankcard. Alternatively, a proxy of the bankcard holder, such as the bankcard issuer, may register bankcards with fare processing system 300 on behalf of the holder. Such a proxy registration may be for an individual card or in bulk for a plurality of cards. Registration data may include bankcard data contained on the card, such as cardholder name, bankcard number or expiration data, and/or bankcard meta-data, such as the billing address or other cardholder data. Registration data transmitted during a proxy registration may include data that is not readily available to the holder, such as an alias bankcard number that is transmitted over the card's wireless interface instead of the actual bankcard number, or such as a cryptographic key and/or shared secret, used to authenticate the bankcard. A proxy may additionally transmit registration data programmatically, via remote procedure calls, using protocols such as REST or SOAP, or by manually or automatically transmitting files to the registration system or directly to the fare processing system 300. In some embodiments of the invention, holder and issuer both supply bankcard data and/or meta-data to registration system 500 and/or fare processing system 300. In some embodiments of the invention, registration system 500 may be part of fare processing system 300.

Fare processing system 300 may also include one or more interfaces to a bankcard verification system 600. The bankcard verification system will verify whether a bankcard is currently a valid bankcard and/or if it is likely to be good for a given amount of money. In some embodiments of this invention, the bankcard verification system is nothing more than an interface to a standard bankcard authorization system, ultimately utilizing a switch to connect to settlement and clearing networks used by debit and credit card companies. In other embodiments, the bankcard verification system is capable of verifying cards independently of a connection to clearing and settlement networks. Because issues of control over the card verification system relate closely to security and liability, in particular when card data is stored, in some instances of the invention, bankcard verification system 600 is under the control of an acquirer, while in others it may be under the control of a processor (processor in the sense of a 3rd party card processing company) and in yet another instance, it may be under the control of a transit network, and finally it may be under the control of a card network.

Figure 2A:
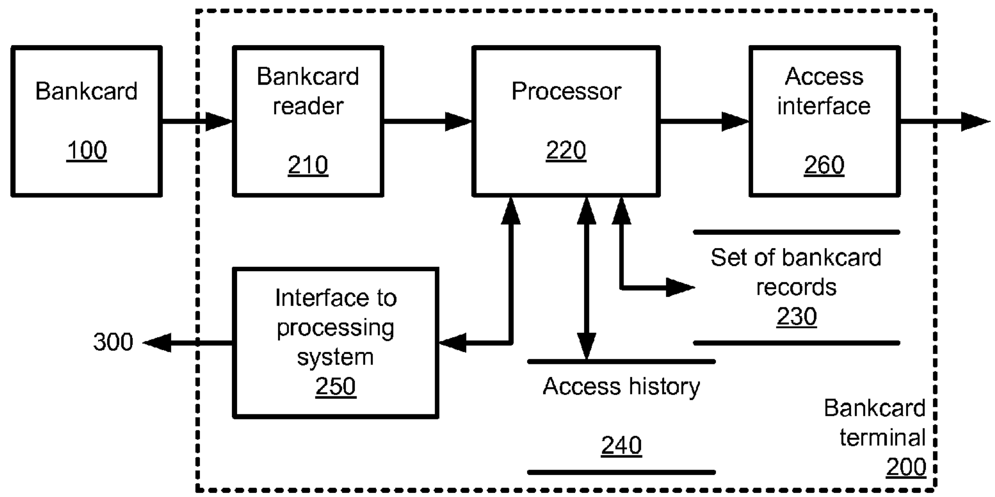
FIG. 2A shows a bankcard terminal 200, in accordance with embodiments of the present invention.

FIG. 2A shows a bankcard terminal 200, in accordance with embodiments of the present invention. Bankcard terminal 200 includes at least one bankcard reader 210, a bankcard terminal processor 220, a first interface 250 to a processing system 300, and a second interface 260 to assist in gating access. In some instance of the present invention, the bankcard terminal has memory to hold a set of bankcard records 230 and access history 240. In some embodiments, a single bankcard terminal 200 has multiple bankcard readers 210. For instance could a single terminal handle an entire station, allowing for a reduction in cost at the expense of reliability. In some instances of the invention, bankcard reader 210 reads user tokens 105, which are not bankcards but simply something uniquely identifiable, such as government issued IDs, including RFID enabled driver's licenses, or biometrics of the rider attempting to gain access.

In some embodiments, bankcard reader 210 provides a physical, electrical, electromagnetic, optical, magnetic, and/or radio frequency (RF) interface to bankcards 100. Bankcard reader 210 may be a receiver without a transmitter or may include both a receiver and a transmitter to communicate with a bankcard 100. A bankcard may transmit bankcard data including: (1) a cardholder's name; (2) a bankcard number (e.g., a PAN as defined in ISO/IEC 7812); (3) an expiration date; (4) security data (e.g., the result of a cryptographic operation based on one or more cryptographic keys stored in the card's memory); (5) issuer private data; and/or (6) records or summaries of past transactions. Bankcards are not limited to what is commonly known as a credit card's physical embodiment.

In some embodiments, bankcard reader 210 simply reads data from bankcard 100 as bankcard 100 passes by it. In some embodiments, bankcard reader 210 transmits a signal to bankcard 100 to access bankcard data. Bankcard reader forwards selective bankcard data or all bankcard data received to bankcard terminal processor 220. In some embodiments, bankcard reader additionally transmits to bankcard terminal processor 220 communication meta-data resulting from communication with the bankcard, such as protocol data.

Bankcard terminal Processor 220 includes a first interface 250 to a fare processing system 300 and a second interface 260 to assist in gating access, as well as an interface to memory. Bankcard terminal processor may be implemented with a microcontroller, a microprocessor and/or other logic circuitry. In some embodiments of the present invention, the bankcard terminal processor 220 reads, writes and updates data in memory representing a set of bankcard records 230, which contains a set of known bankcards, and an optional access history 240, which keeps a history of bankcards presented to bankcard terminal 200 and may be used for billing. In other embodiments of the invention, the set of bankcard records 230 and/or access history 240 may be located elsewhere, for instance with or in fare processing system 300 or bankcard verification system 600, described in further detail below. The set of bankcard records 230 and access history 240 may be in the form of one or more sequential lists, tree structures, other sorted data structures and/or databases, which may be indexed or searchable by one or more an identifiers such as a hash value or the identifier of a bank card, such as a PAN or a PAN alias. The set of bankcard records 230 may be presorted for faster subsequent searching. The set of bankcard records 230, access history 240 and identifiers are described in more detail below.

Figure 2B:
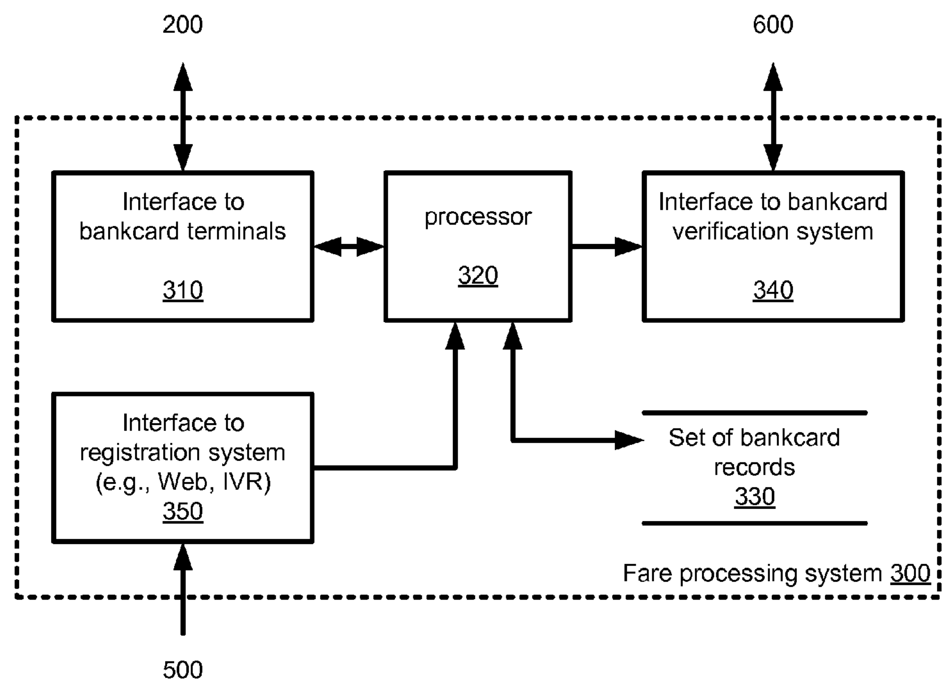
FIG. 2B shows a fare processing system 300, in accordance with embodiments of the present invention.

FIG. 2B shows a fare processing system 300, in accordance with embodiments of the present invention. Fare processing system 300 is associated with one or more transit systems and may be part of or separate from the transit systems. Fare processing system 300 includes a first interface 310 to communicate with one or more bankcard terminals 200, a processor 320, memory, a second interface 340 to communicate with a bankcard verification system, and a third interface 350 to communicate with a bankcard registration system.

Processor 320 is coupled to and communicates with first interface 310, second interface 340 and third interface 350, respectively. Processor 320 is also coupled to memory and manipulates a set of known bankcard records 330 held in the memory. The set of known bankcard records 330 may contain bankcard data (such as a bankcard number, usually a PAN and/or a PAN alias as described below) or one or more hash values computed from the bankcard data. Processor 320 may be implemented with a microcontroller, a microprocessor and/or other logic circuitry.

The set of known bankcard records 330 contains an identifier of each bankcard in the set. The bankcard 100 may be one that was previously presented by a respective holder of the bankcard 100 to fare processing system 300 and verified by fare processing system 300. A presentation may be by way of a physical presentation by the holder at a bankcard terminal 200 at a gate or entrance of a transit system. Alternatively, the presentation may be by way of registering the bankcard 100 over the telephone, for example, using an IVR system, or by way of registering using the Internet, for example, using a web browser. Alternatively, the presentation may be by a bank or other financial institution enabling the bankcard by communicating with processor 320. Such a financial institution may provide multiple presentations to fare processing system 300 individually or in a batch process.

At a bankcard terminal, bankcard data received via a magnetic stripe may differ from that received over the air through an RF connection, which may differ still from bankcard data received via a registration system. For example, bankcard data may contain a Primary Account Number (PAN), which is typically a 15-digit to 16-digit numeric code embossed on the face side of a bankcard, and which is also encoded in the magnetic stripe. PAN is further defined in ISO/IEC 7811 and ISO/IEC 7812. The PAN standard allows up to 19 digits. The PAN standard allows for three main components in the form nnnn nndd dddd ddds where: (1) nnnn nn is the Issuer Identification Number (IIN) (typically six digits); (2) dd dddd ddd is the NIH ID number or individual account identification (IAI) (up to twelve digits) without the check digit; and (3) s is the ISO/EIC 7812-1 check digit. A bankcard having a wireless chip may be coded with a different identifying number than the PAN. For example, when a bankcard communicates with an RF reader, it will send an alias or ghost of the PAN rather than the PAN itself. The PAN alias may need to be mapped to a PAN for further processing. Not all bankcards are in full compliance with aforementioned standards (e.g., some do not use a check digit). Some embodiments of the present invention operate with bankcards compliant with these PAN ISO/IEC standards while other embodiments operate with non-compliant bankcards not compliant to the PAN ISO/IEC standards. Still other embodiments of the present invention operate with a family of compliant and non-compliant bankcards.

If a bankcard is expected to provide different identifying data (e.g., PAN alias) rather than the credit card number (e.g., PAN), the bankcard terminal 200, fare processing system 300, verification system or the like will provide a translation between the alias PAN and the PAN. In some cases, the set of bankcard records 230 in the bankcard terminal 200 contains a PAN, an alias PAN, a hash value based on the PAN, and/or a hash value based on the alias PAN. In some cases, the set of known bankcard records 330 in the fare processing system 300 contains a PAN, an alias PAN, a hash value based on the PAN, and/or a hash value based on the alias PAN.

As stated above, the set of bankcard records 230 may be presorted for faster subsequent searching. For example, the set of bankcard records 230 may be stored as a self-balancing tree. In some embodiments, a bankcard identifier is determined using the Issuer Identification Number (IIN) and the individual account identification (IAI) without the check digit. The check digit is not included in the determined bankcard identifier because it is simply a checksum value and does not provide any additional identification. In some embodiments, the determined bankcard identifier includes the individual account identification (IAI) and the record is stored together with other determined bankcard identifier having the same Issuer Identification Number (IIN). In these embodiments, a first lookup will search for the IIN and a second lookup will subsequently search for the IAI. In some embodiments, the IIN is used for the first search and a hash value is created and used for the IAI. In other embodiments, a first hash value is created for the IIN and a second hash value is created for the IAI. These embodiments provide for both compact storage and sufficient speed. Some embodiments require that the time between bankcard presentation by a cardholder and granting or denying access be within 200 milliseconds. Therefore, a search of the set of bankcard records 230 should be complete within 200 milliseconds.

First interface 310, second interface 340 and third interface 350 may share a common physical interface, for example, the physical interface may be an Ethernet connection to the Internet and/or an intranet. In this case, first interface 310, second interface 340 and third interface 350 share a common physical interface but are logically three different interfaces. For example, first interface 310, second interface 340 and third interface 350 may each have a unique socket identifier.

FIG. 3 illustrates a state diagram, in accordance with embodiments of the present invention. Bankcards may be considered to be in one of two classifications: an unknown bankcard 20 or a known bankcard 30. An unknown bankcard 20 represents a bankcard that has not been presented by a respective holder of the bankcard. Thus, the set of bankcard records 230 (in FIG. 2A) and the set of known bankcard records 330 (in FIG. 2B) will now have an identifier for the unknown bankcard 20.

When an unknown bankcard 20 is presented it becomes a known bankcard 30. A known bankcard 30 may also be considered to be in one of two classifications: a known valid bankcard 32 or a known invalid bankcard 34. A known valid bankcard 32 represents a bankcard that has been presented by a respective holder of the bankcard as well as verified with a bankcard verification system 600. A known invalid bankcard 34 represents a bankcard that has been presented by a respective holder of the bankcard 100; however, verification with a bankcard verification system 600 has failed in some respect. For example, bankcard terminal 200 or fare processing system 300 was unable to communicate with bankcard verification system 600. Alternatively, bankcard terminal 200 or fare processing system 300 communicated with bankcard verification system 600, which indicated bankcard 100 is somehow the invalid for a purchase. A known valid bankcard 32 may transition to a known invalid bankcard 34, for example, if an attempt to clear and settle a transaction fails. Similarly, a known invalid bankcard 34 may transition to a known valid bankcard 32, for example, if an attempt to verify or to clear and settle a transaction completes successfully.

FIG. 4 represents a flowchart implementation for operations in a bankcard terminal 200, in accordance with embodiments of the present invention. In 401, a respective holder of a bankcard 100 presents the bankcard to a bankcard terminal 200 for access to a transit system. Bankcard terminal 200 reads, from the bankcard, bankcard data including a bankcard identifier. Bankcard terminal 200 determines an identifier, such as a credit card number read from the bankcard data or by computing a hash value based on the bankcard identifier.

A bankcard terminal 200 may receive bankcard data from one or more of several paths. First, a bankcard terminal 200 may receive bankcard data directly from a bankcard's magnetic stripe (e.g., a bankcard holder may pass a magnetic stripe of a bankcard 100 through a magnetic stripe reader on the bankcard reader 210). Second, a bankcard terminal 200 may receive bankcard data via an RF connection between the bankcard terminal 200 and the bankcard (e.g., a wireless chip in a bankcard 100 may communicate with a radio transceiver in a bankcard reader 210). Third, a bankcard terminal 200 may receive bankcard data directly from electronic contacts to a smart chip on the bankcard. Fourth, bankcard terminal 200 may receive bankcard data from a fare processing system 300, which previously received bankcard data from an external connection (e.g., IVR system, Internet/web interface, and/or financial institution and/or one or more agents of financial institutions). After receiving and processing bankcard data received from a third interface 350 to a registration system 500, the fare processing system 300 may send bankcard data to a bankcard terminal 200 through its first interface 310, second interface 340 and third interface 350.

A hash function may be used to compute a hash value from the bankcard data. A hash function or hash algorithm is a reproducible method of turning bankcard data into hash data that may serve as a digital fingerprint of the bankcard data. The hash function may be considered to chop and mix (i.e., substitutes or transposes) the data to create such a fingerprint. The fingerprint may be called hash sums, hash values, hash codes or simply hashes. The hash computation may be based on a cryptographic hash function. Broadly speaking, a cryptographic hash function behaves like a random function while still being deterministic and efficiently computable.

In 402, bankcard terminal 200 uses the determined identifier to tell whether or not the bankcard is contained in a set of bankcard records and whether or not the bankcard is a known valid bankcard. In some embodiments of bankcard terminal 200 that have an interface to a bankcard verification system 600, an attempt is made to verify the bankcard at 404. At 405, bankcard terminal 200 determines whether or not the bankcard was successfully verified. At 406, if the bankcard was successfully verified, the set of bankcard records 230 is updated with the determined identifier for the currently presented bankcard. At 407, if the verification was unsuccessful, access is denied, for example by not opening a gate and/or by activating an audio and/or visual indicator to the bankcard holder and/or to a conductor. At 403, if the determined identifier was already in the set of bankcard records 230 as a known valid bankcard or was added to the set of bankcard records (at 406), access to the transit system is allowed, for example, by opening the gate and/or by activating an audio and/or visual indicator to the bankcard holder and/or to a conductor.

Figure 5:
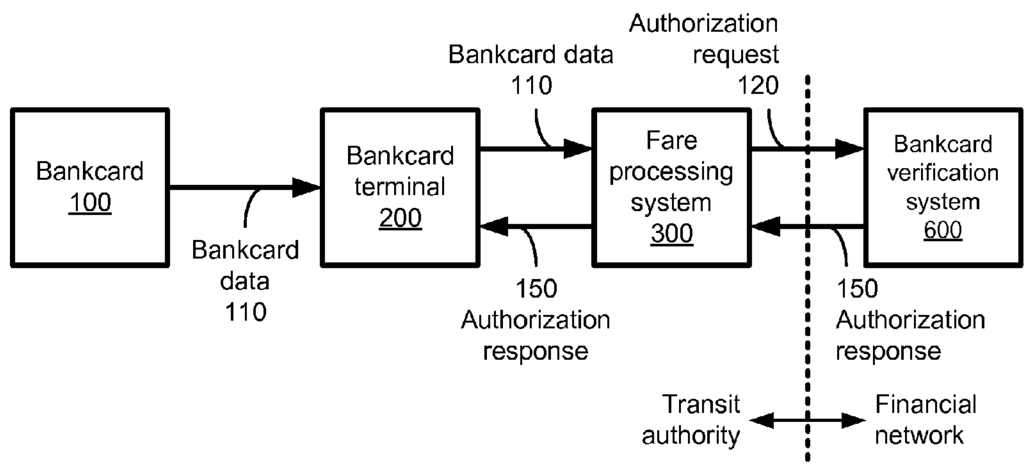
FIG. 5 shows the minimal steps required to conduct a bankcard transaction in a transit context where a bankcard 100 transmits bankcard data 110 to bankcard terminal 200.

FIG. 5 shows the minimal steps required to conduct a bankcard transaction in a transit context where a bankcard 100 transmits bankcard data 110 to bankcard terminal 200. Bankcard data 110 may be all or a subset of the data contained on bankcard 100, and/or data computed on bankcard 100, such as data resulting from cryptographic operations or from the card holder interacting with the card, such as entering a PIN or providing biometric data. In response to receiving bankcard data 110, bankcard terminal 200 passes bankcard data 115, which may be identical to bankcard data 110, or may be computationally derived from bankcard data 110, for instance an encrypted version of it, on to fare processing system 300. Depending on its programming and state, such as fare rules and historic data associated with bankcard 100, fare processing system 300 may create an authorization request 120 based on bankcard data 115 to increase the likelihood that a fare balance due can later be settled. Authorization request 120 will be for specific amount of money, including very small amounts to simply ensure the validity of a card (thereby performing authentication only). Authorization request 120 passes the virtual boundary between transit authority and financial network and is received by bankcard verification system 600.

A system as illustrated in FIG. 5 is too slow for transit, sometimes requiring more than 30 seconds just for the communications in the financial network domain, whereas the commonly accepted maximal duration for a bankcard transaction in mass transit is 300 ms, dictated by the speed by which travelers pass the transit gates during rush hour. The present invention adds a verification proxy 610 that circumvents or delays the use of bankcard verification system 600. In some embodiments of the invention, the authorization proxy receives authorization request 120 from fare processing system 300 and replies to the same with authorization response 130, and in response to authorization request 120 sends authorization request 140 to bankcard verification system 600 and receives authorization responses 150 from the same.

Figure 6:
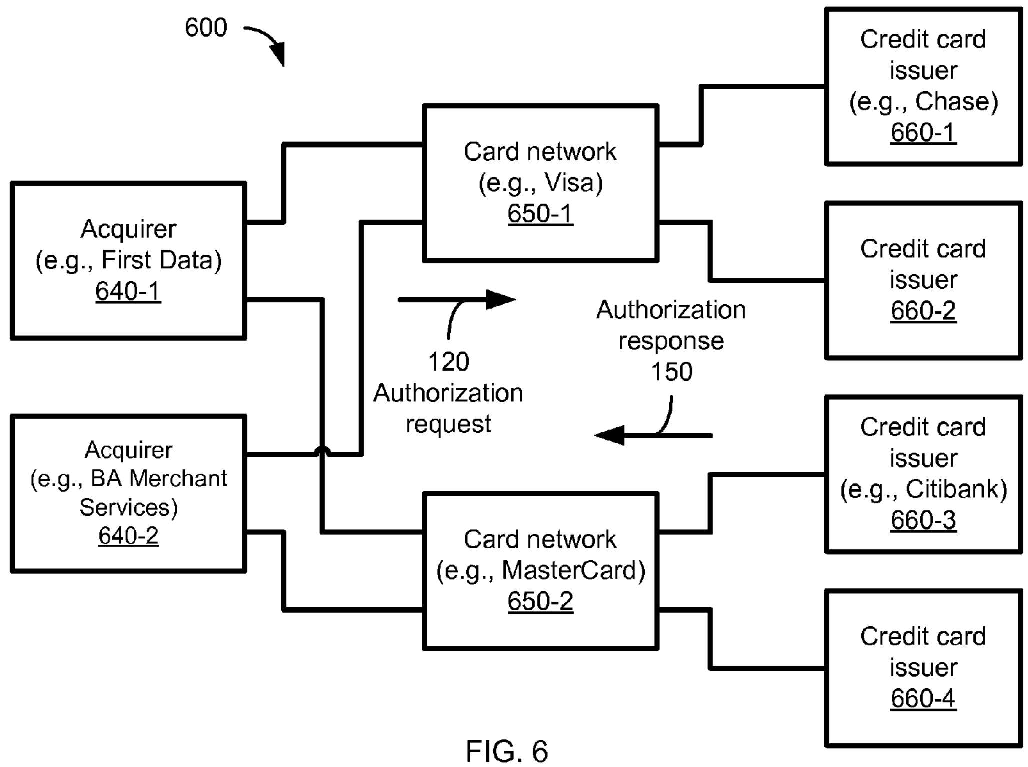
FIG. 6 shows an exemplary instance of a bankcard verification system 600.

FIG. 6 shows the topology of a bankcard infrastructure 600 to which a fare processor is connected, in some embodiments of the present invention, for purposes of authenticating bankcards and/or receiving payment from bankcard holders. An authorization request 120 that originated at fare processor 300 (FIG. 5) flows from an Acquirer 640 through a card network 650 until it reaches the card's issuer 660. In some embodiments, e.g., where the Acquirer has principally the function of an underwriter, fare processor 300 is connected directly to card network 650. The authorization response 150 then flows in the opposite direction back to the fare processor. In some embodiments, the authorization response will not originate at the card's issuer: instead the network issues a "stand-in" authorization, e.g., if the issuer is unreachable.

In FIG. 6, an exemplary instance of a bankcard verification system 600 is shown. Merchants have traditionally been passing their data to an acquirer 640 (usually a bank), who will have the technology to route transaction data, such as authorization request 120, to the correct payment network 650. It is usually up to the payment network to route the authorization request to the card issuer 660, although it is standard practice for the network to stand in for the issuer under certain conditions, such as communication failures. An authorization response 150 will be passed back to the merchant, unless this is prevented by an exceptional condition, such as a communications error.

Figure 7:
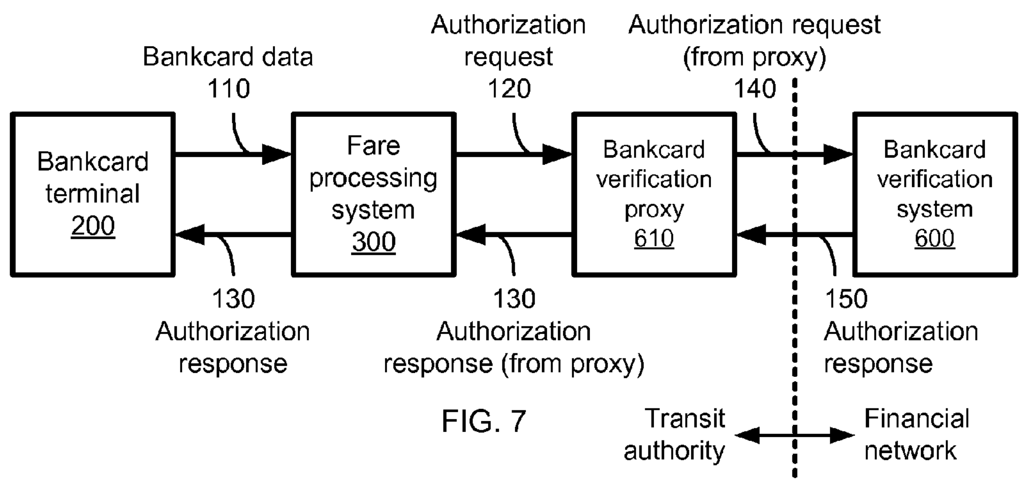
FIG. 7 shows an embodiment of the invention, where authorizations are handled by an authorization proxy 140 which may consult with bankcard infrastructure 600.

FIG. 7 shows an embodiment of the invention, where authorizations are handled by an authorization proxy 140 which may consult with bankcard infrastructure 600. One reasons for the described configuration is speed (authorizations from the issuer usually take seconds, authorizations at the proxy milliseconds), which is of the essence in mass transit, where busy turnstiles can have traffic of 90 people per minute. Another reason is that the proxy can have transit network specific information available to it. The flow shown is for the case where the proxy 140 can make an authorization by itself and in response sends a separate authorization request into bankcard infrastructure 600.

Figure 8:
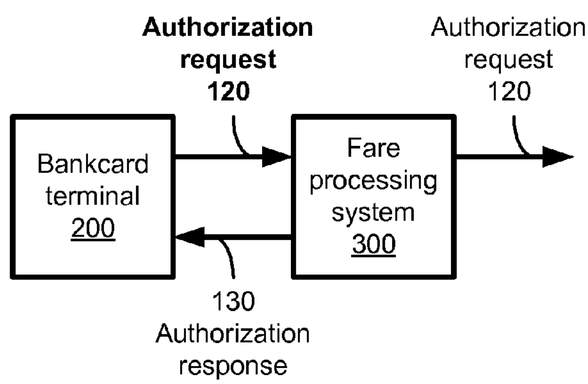
FIG. 8 shows another flow, where the proxy 140 delegates the authorization 120 and passes it on verbatim.

This configuration is depicted in FIG. 7, which also indicates the preferred geographical location of bankcard verification proxy 610 in this configuration, namely at the transit authority, close to fare processing system 300 for best communication speed and reliability. It should be noted that geographic location does not necessarily imply legal ownership or liability for bankcard verification proxy 610; it would usually be owned or operated by an acquirer or network. FIG. 8 shows another flow, where the proxy 140 delegates the authorization 120 and passes it on verbatim similar to FIG. 7.

Figure 9:
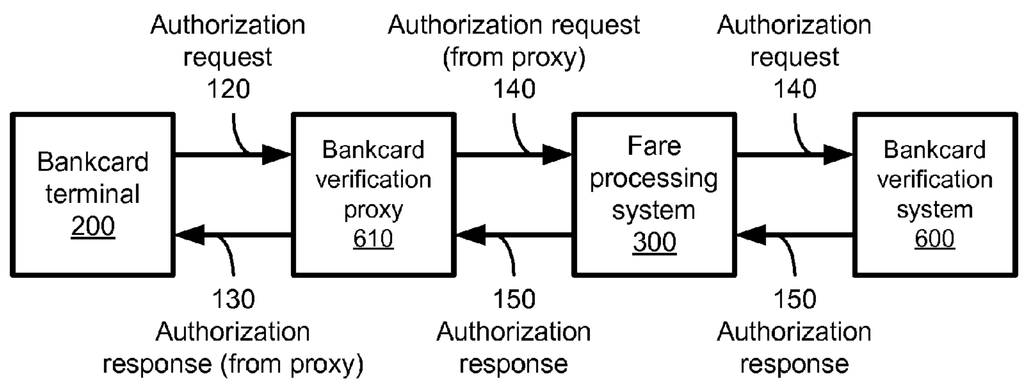
FIG. 9 depicts a bankcard verification proxy 610 moved closer to bankcard terminal 200 to improve performance and reliability, according to some instances of the present invention.

FIG. 9 depicts a bankcard verification proxy 610 moved closer to bankcard terminal 200 to improve performance, according to in some instances of the present invention. It then receives authorization request 120 directly from bankcard terminal 200 and responds to the same with an authorization response 130. Bankcard verification proxy 610 may send it's authorization request 140 to bankcard verification system 600 directly or via fare processing system 300 as shown in FIG. 9. Similarly, the authorization response 150 is received by bankcard verification proxy 610 directly or via fare processing system 300 as shown in FIG. 9.

Figure 10:
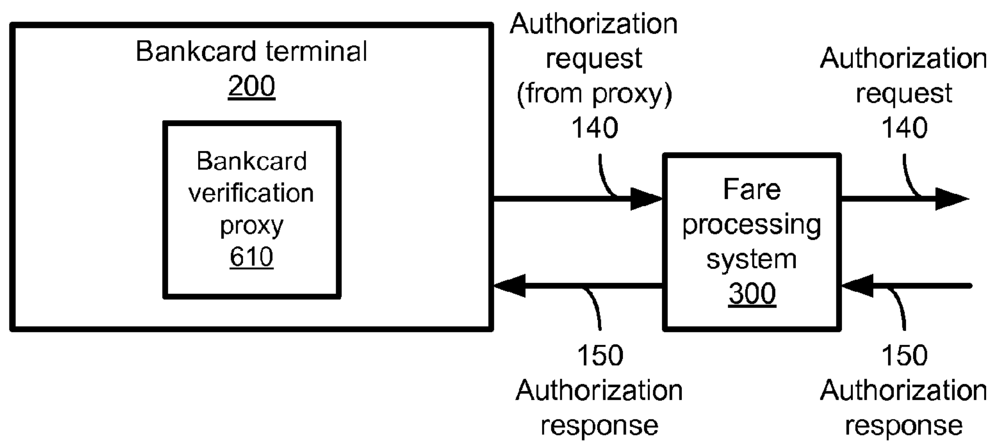
FIG. 10 shows a bankcard verification proxy 610 as part of bankcard terminal 200, to further improve performance and reliability according to some instances of the present invention.

FIG. 10 shows a bankcard verification proxy 610 as part of bankcard terminal 200, according to some instances of the present invention. The arrangement provides the shortest possible path of communication between bankcard verification proxy 610 and bankcard terminal 200, and also ridding the system of an important point of failure by decentralizing bankcard verification proxy 610. In this configuration, authorization request 140 is sent to from bankcard terminal 200 to bankcard verification system 600 directly or via fare processing system 300. Likewise, the authorization response 150 is received by bankcard verification proxy 610 directly or via fare processing system 300. Such a design requires that bankcard terminal 200 be particularly well secured, because it is more accessible than a server in a data center. For even better reliability, bankcard verification proxy 610 may be distributed among several bankcard terminals.

Figure 11:
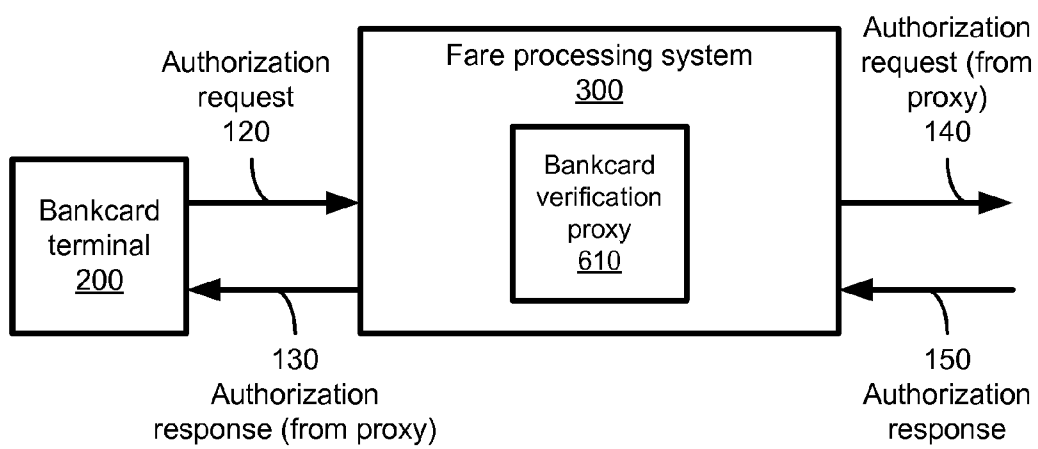
FIG. 11 shows a bankcard verification proxy 610 as a component of fare processing system 300, according to yet other instances of the present invention.

FIG. 11 shows a bankcard verification proxy 610 as a component of fare processing system 300, according to yet other instances of the present invention. In this configuration, bankcard terminal 200 sends authorization request 120 to fare processing system 300, which responds with authorization response 130, generated by contained bankcard verification proxy 610. In response, fare processing system 300 sends authorization request 140, also generated by contained bankcard verification proxy 610, to bankcard verification system 600, which responds with authorization response 150.

Figure 12:
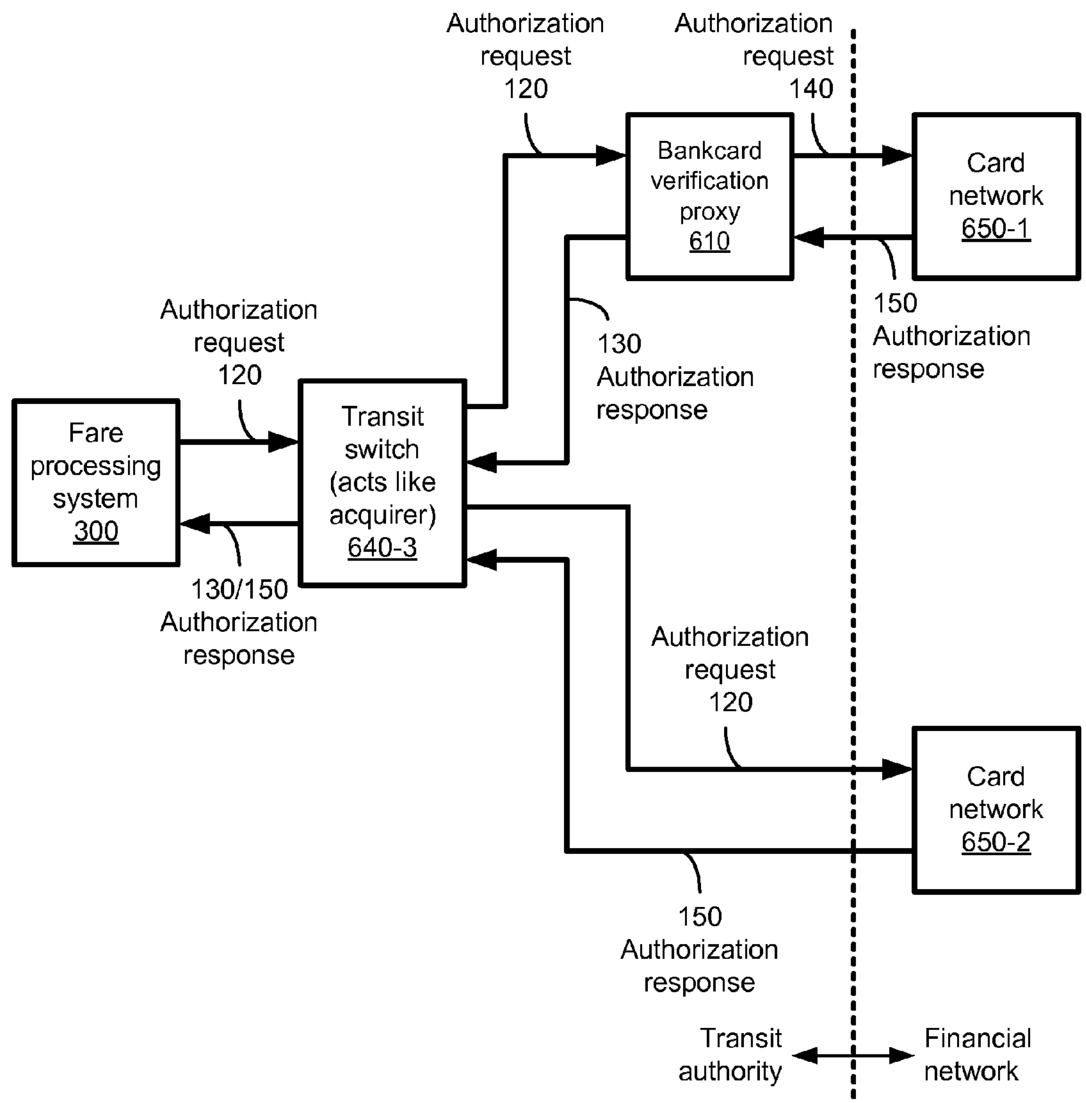
FIG. 12 shows a bankcard verification proxy 610 being used only for some card networks, in accordance with some instances of the present invention. Additionally, it shows the use of a transit switch, which acts as a bankcard verification proxy.

FIG. 12 shows a bankcard verification proxy 610 being used only for some card networks, in accordance with some instances of the present invention. For this, it either is deployed between switch 640-3 and card network 650-1 (as shown) or, alternatively, bankcard verification proxy 610 may, regardless of its logical location, selectively pass authorization requests 120 upstream based on criteria that include the card network. In the configuration shown in FIG. 12, authorization request 120 is routed by switch 640-3 to the appropriate card network 650. Requests destined for card network 650-1 are passed on to bankcard verification proxy 610, while requests destined for card network 650-2 are not intercepted by a proxy and are always processed directly by that card network, which responds with authorization response 150 that is then routed to the originator of the corresponding authorization request 120, whereas authorization requests 120 that are destined for card network 650-1 are intercepted, and may be responded to, by bankcard verification proxy 610. As in FIG. 7, the boundary between transit authority and financial network in FIG. 12 indicates the preferred geographical location, which may differ from operational and legal boundaries.

Figure 13:
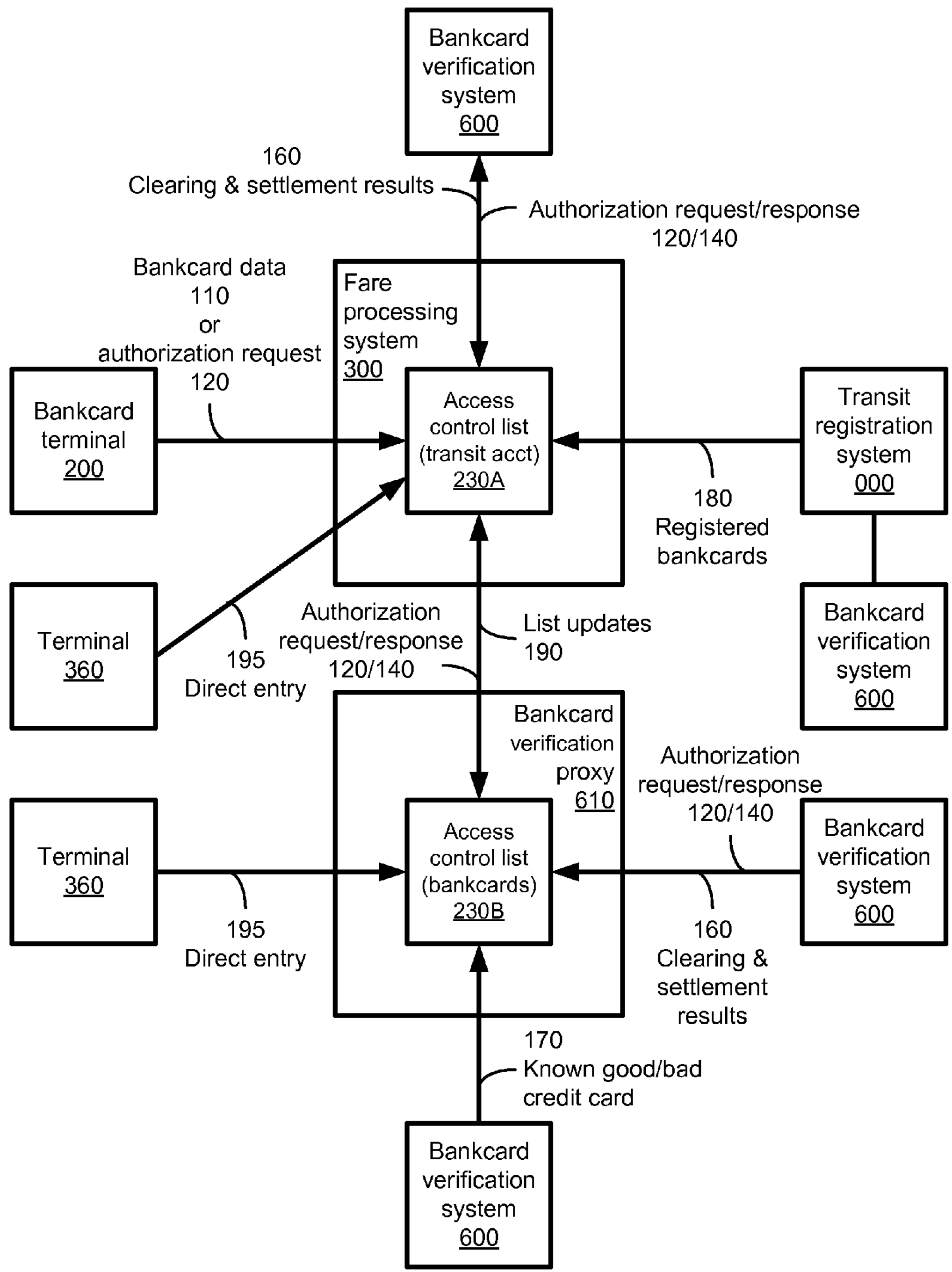
FIG. 13 depicts a bankcard verification proxy 610 and fare processing system 300 draw upon access control lists (ACL) that are maintained by interpreting data from various sources, according to some embodiments of the present invention.

FIG. 13 depicts a bankcard verification proxy 610 and fare processing system 300 draw upon access control lists (ACL) that are maintained by interpreting data from various sources, according to some embodiments of the present invention. In some instances, transit account ACL 230A is maintained by fare processing system 300 by incorporating information about registered bankcards 180 from transit registration system 500, which, in some instances of the invention, uses a bankcard verification system 600 to authenticate and/or authorize bankcards during registration. In some instances of the invention, transit account ACL 230A is maintained by interpreting authorization response 140 and/or settlement response 160 received from bankcard verification system 600 in response to authorization request 120. In some instances of the invention, transit account ACL 230A is maintained by interpreting bankcard data 110 and/or bankcard authorization request 120 as received from bankcard terminal 200. In some instances of the invention, transit account ACL 230A is manipulated directly at terminal 360 via direct entry data 195. In some instances, transit account ACL 230A is maintained by interpreting list updates 190 derived from bankcard ACL 230B. In some instances of the invention, transit account ACL 230A is replicated, in whole or in part, on Bankcard Terminal 200. In other instances of the invention, transit account ACL 230A is maintained entirely on one or more instances of Bankcard Terminal 200.

Likewise, in some instances of the invention, bankcard ACL 230B is maintained by interpreting list updates 190 derived from transit account ACL 230A. In some instances of the invention, bankcard ACL 230B is manipulated directly at terminal 360 via direct entry data 195. In some instances of the invention, bankcard ACL 230B is maintained by interpreting known good and/or known bad data 170 received via bankcard verification system 600, for example a list of stolen or lost cards. In some instances of the invention, bankcard ACL 230B is maintained by interpreting authorization response 140 and/or settlement response 160 received from bankcard verification system 600 in response to authorization request 120. In some instances of the invention, bankcard ACL 230B is replicated, in whole or in part, on Bankcard Terminal 200, even if the configuration differs from FIG. 10. In other instances of the invention, bankcard ACL 230B is maintained entirely on one or more instances of Bankcard Terminal 200, even if the configuration differs from FIG. 10. In some instances of the invention, as described above and indicated in FIG. 11, transit account ACL 230A and bankcard ACL 230B are both maintained by fare processing system 300.

Figure 14:
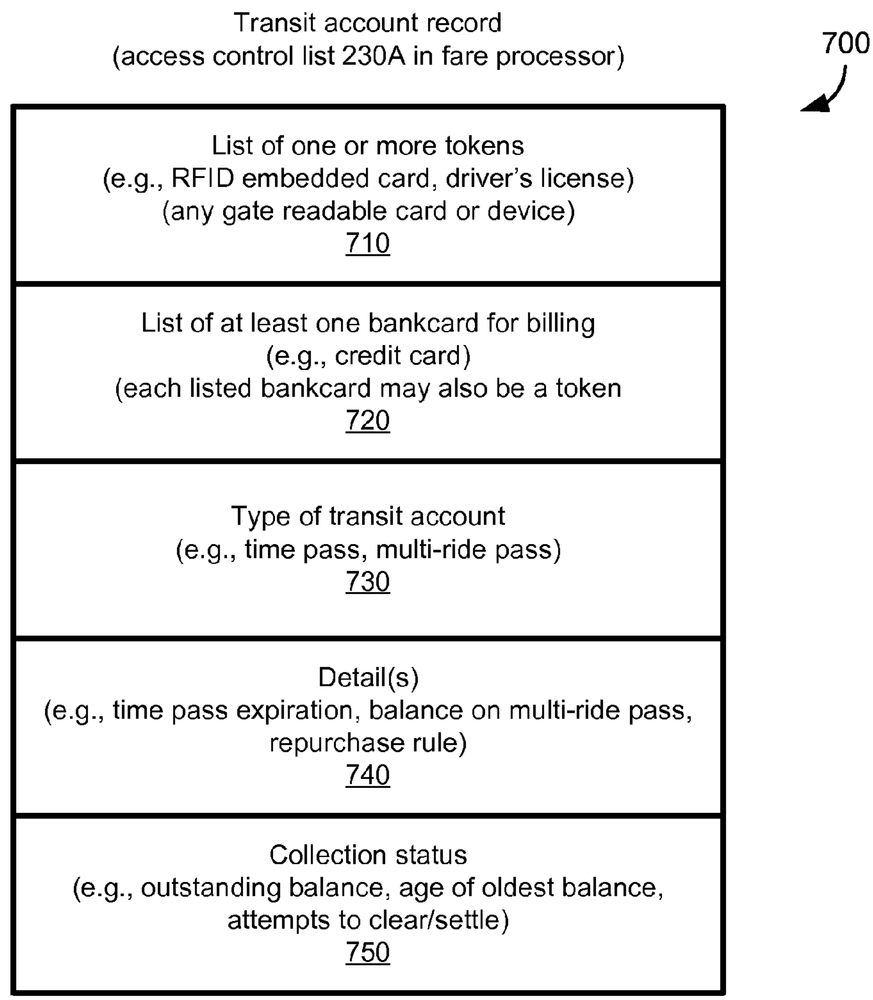
FIG. 14 details a transit account ACL 230A containing transit account record 700, according to some instances of the present invention.

FIG. 14 details a transit account ACL 230A containing transit account record 700, according to some instances of the present invention. A transit account record may reference: (1) list of tokens 710 of one or more tokens (whereas a token is anything a rider may present to the gate to authenticate themselves) and their status (e.g., valid/invalid); (2) list 720 of at least one method of billing, including bankcards, whereas each bankcard may also be a token, so that list of tokens 710 and list 720 may in some instances of the invention be one and the same; (3) optionally list 730 of fare products, such as a monthly pass including: (4) details 740 for fare products if required; and (5) collection status of account. The collection status may be stored indirectly by storing and maintaining one or more balances.

Figure 15:
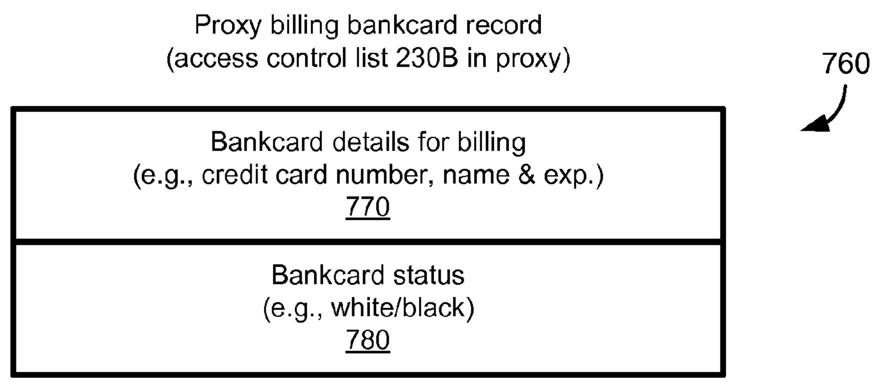
FIG. 15 details a bankcard ACL 230B containing a bankcard record 760.

FIG. 15 details a bankcard ACL 230B containing a bankcard record 760. A bankcard record references bankcard details 770, such as the card's PAN, the imprinted name, expiration date. In some instances of the invention, bankcard details 770 include additional data, such as the associated billing address, a cryptographic hash or secondary card details, such as an RF fingerprint of the card or the manufacturer of the card's circuitry. A bankcard record 760 additionally contains bankcard status 780, such as reference to historical data or a flag, such as a black/white flag.

Figure 16A:
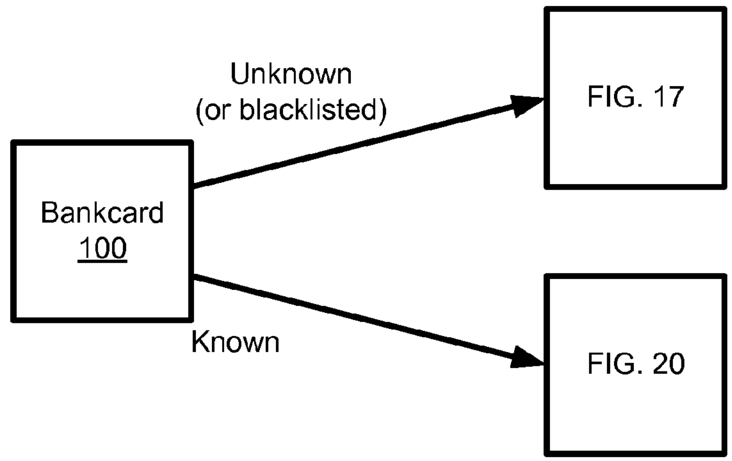
FIG. 16 shows the invention's response to a presented user token 105, according to some embodiments of the present invention.
Figure 16B:
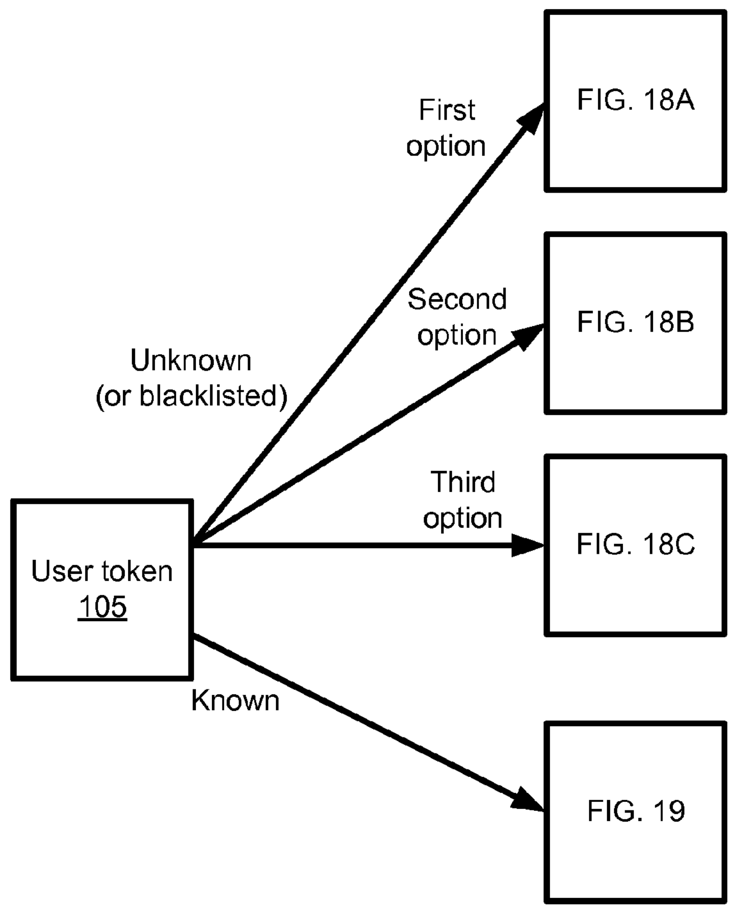
Figure 17:
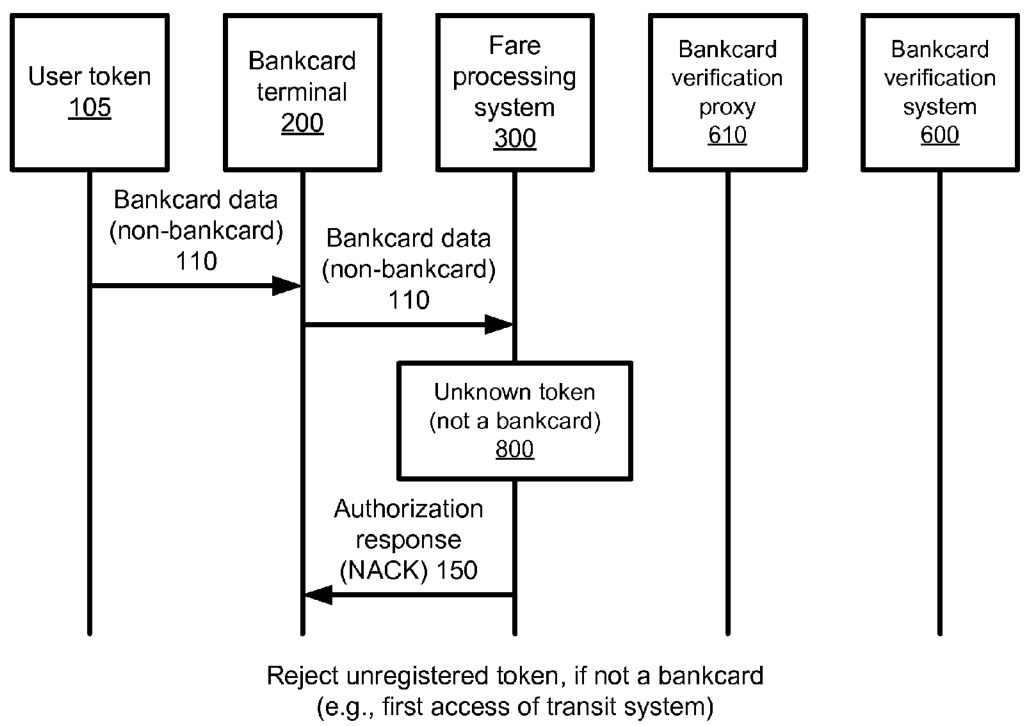
FIG. 17 shows the response to a presently unknown or black listed user token.
Figure 20:
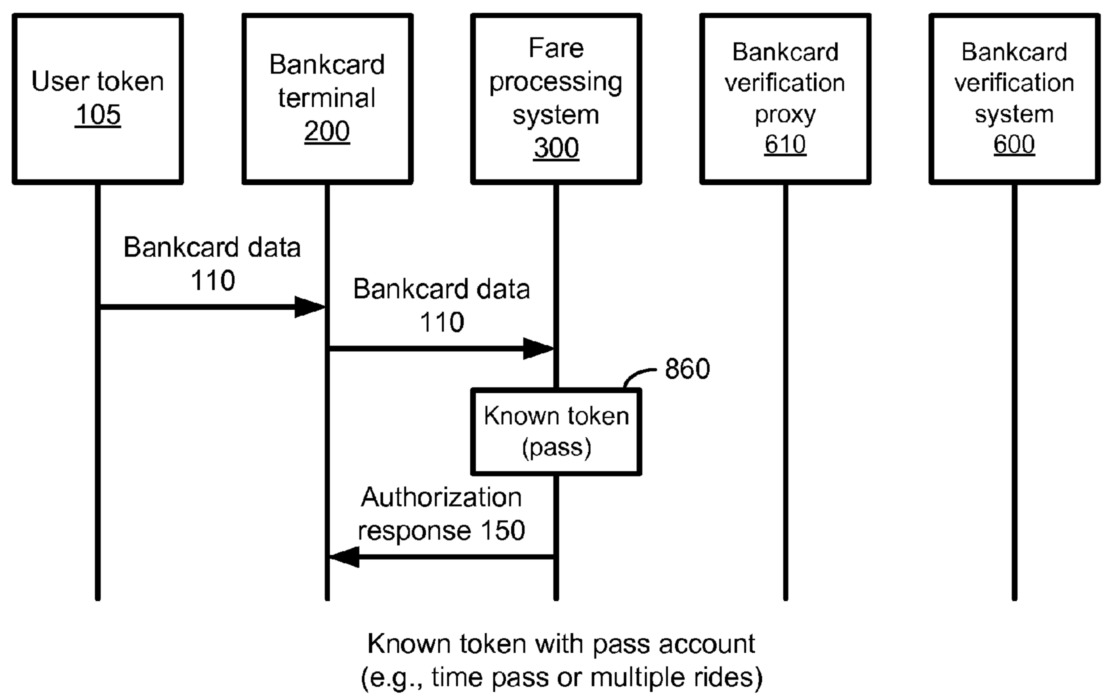
FIG. 20 shows the response to a known valid user token.

FIGS. 16A and 16B show the invention's response to a presented user token 105, according to some embodiments of the present invention. Two presented user tokens 105 (e.g., a government ID or a biometric hand scan) may differ based on user token 105 being a determined to be a known valid user token or being a presently unknown or black listed (i.e., known invalid) user token. FIG. 17 shows the response to a presently unknown or black listed user token. The response to a known valid user token is shown in FIG. 20.

The invention's response to a presented bankcard 100 differs, as shown in FIG. 16B, based on bankcard 100 either being determined to be a known valid bankcard or as a presently unknown or black listed (i.e., known invalid) bankcard. The response to a known valid bankcard is shown in FIG. 19. Responses to a presently unknown or black listed bankcard are shown in FIGS. 18A through 18C.

FIG. 17 shows the response to an unregistered user token 105, as indicated above, is shown in FIG. 17: non-bankcard bankcard data 110, relating to user token 105, is received by bankcard terminal 200 in response to the presentation of user token 105. Bankcard terminal 200 passes on the non-bankcard bankcard data 110 (or data derived from it) to fare processing system 300, which makes a determination based on transit account ACL 230A, specifically by examining the list of one or more lists of tokens 710 for the existence and status of user token 105. After user token 105 is determined to be an unknown non-bankcard user token 800 (i.e., it is not listed in transit account ACL 230A) or determined to be invalid (i.e., it is listed on transit account ACL 230A as invalid), negative authorization response 150 is returned to bankcard terminal 200, which, for example, signal this result by lighting up a no-entry sign at a turnstile. FIG. 17 is specific to a configuration of the invention, where transit account ACL 230A is not replicated in whole or in part to bankcard terminal 200. In a configuration where the ACL 230A is replicated in whole or in part to bankcard terminal 200, the determination can be arrived at without contacting fare processing system 300.

Figure 18A:
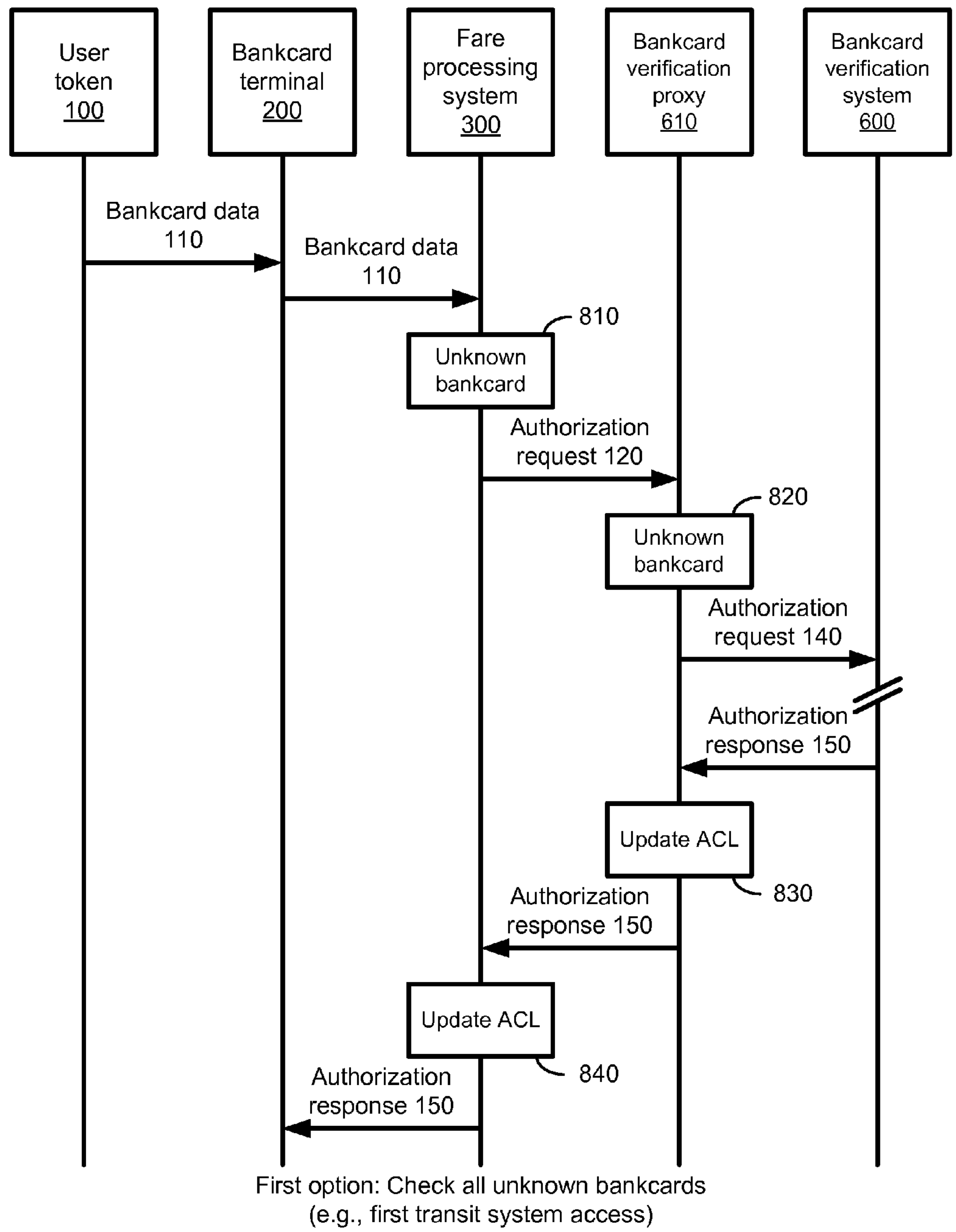
FIGS. 18A, 18B and 18C show the response to the presentation of an unknown or black listed bankcard 100, as implemented in some embodiments of the invention.
Figure 18B:
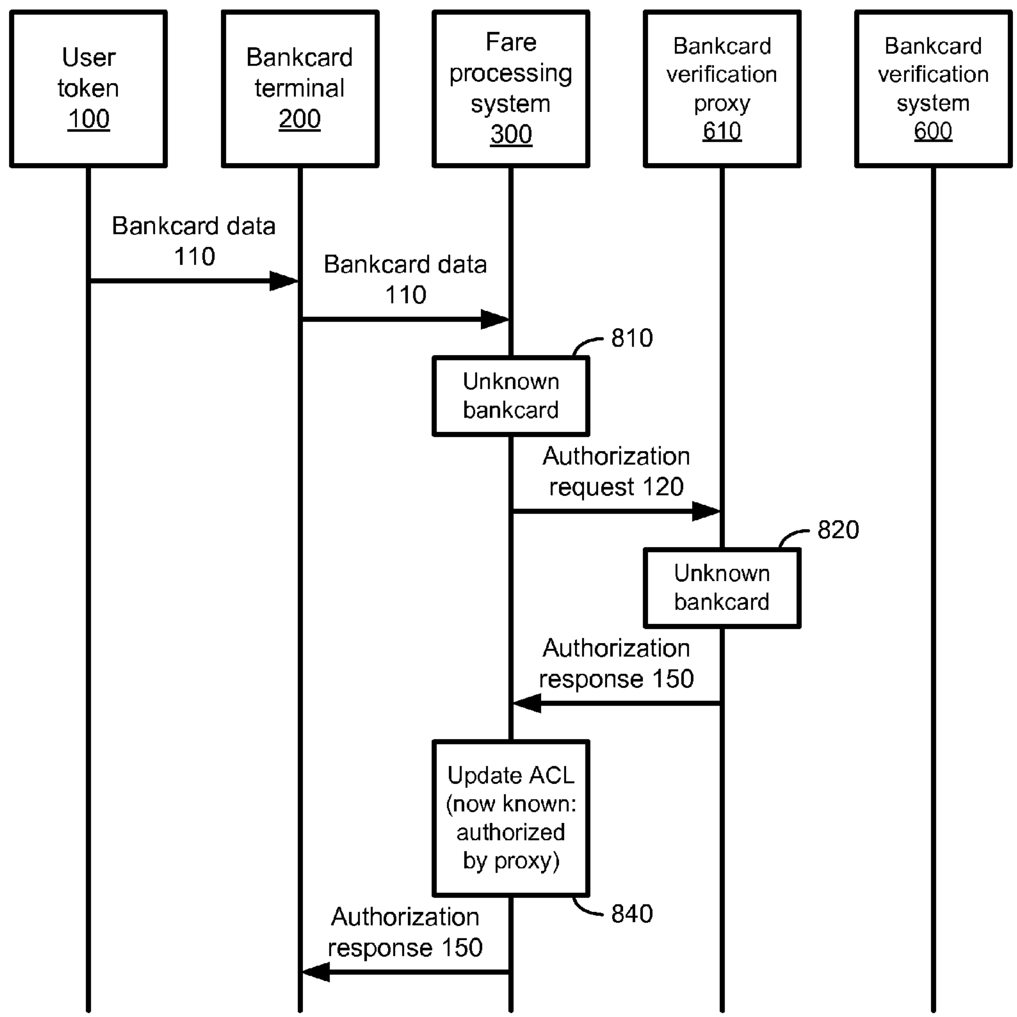
Figure 18C:
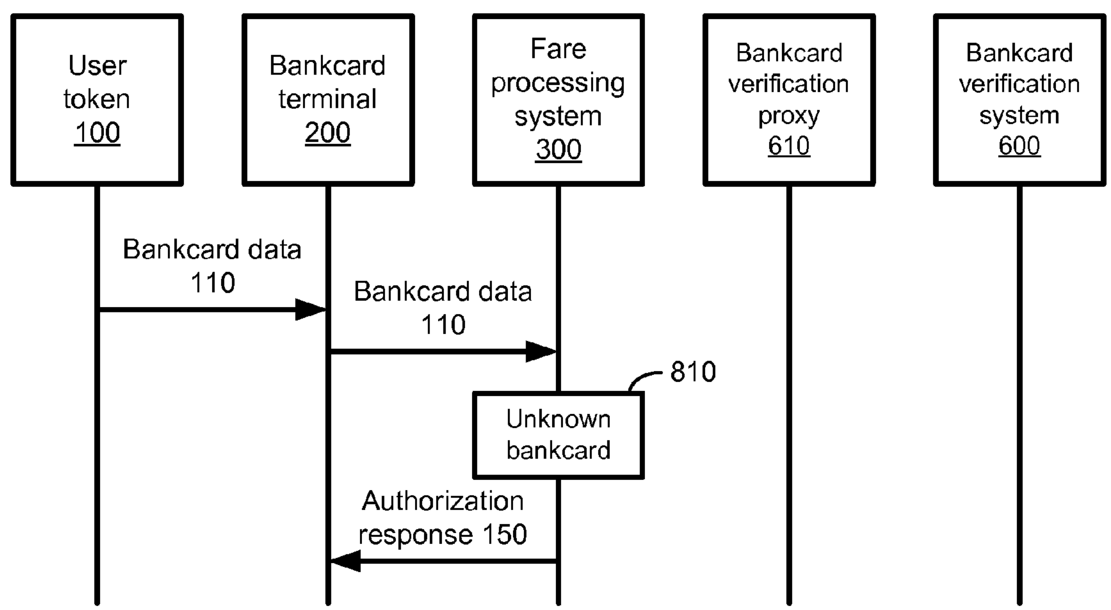
Figure 19:
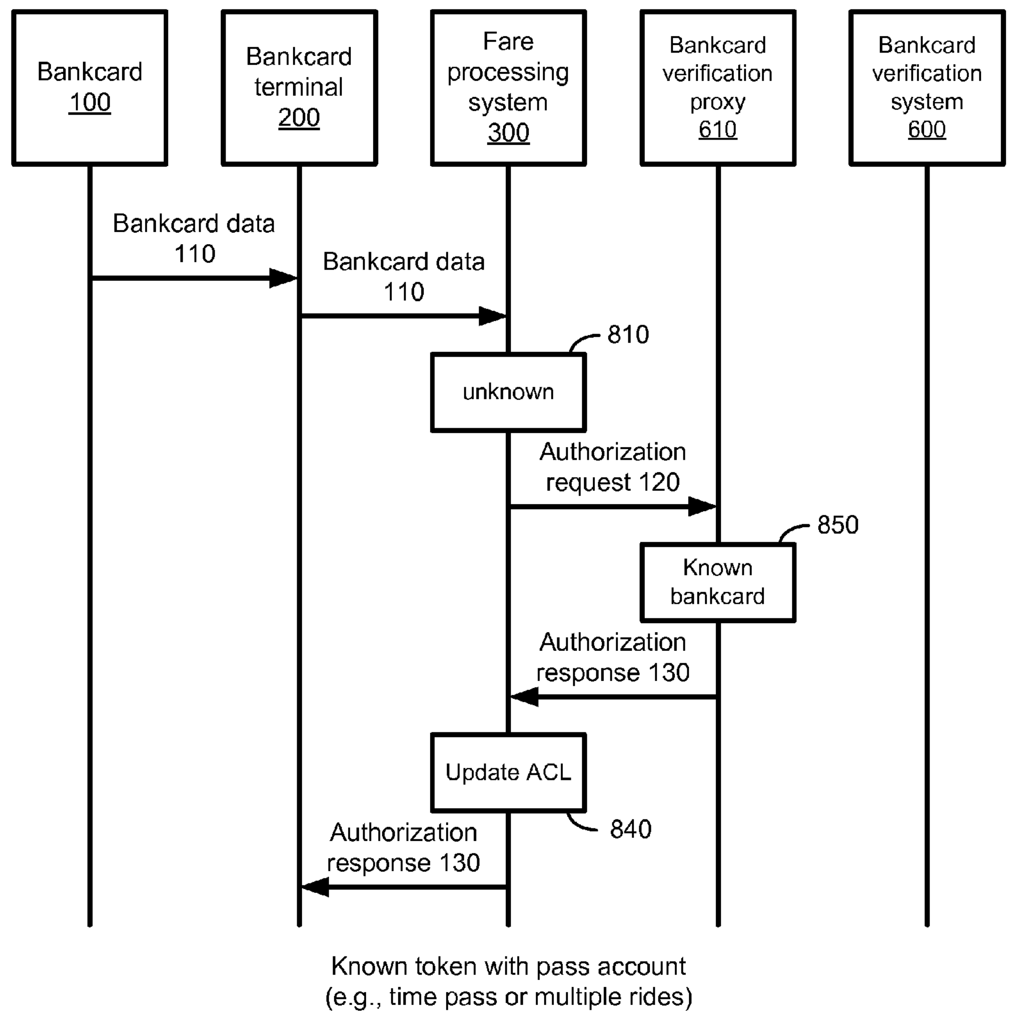
FIG. 19 shows the response to a known valid bankcard.

FIGS. 18A, 18B and 18C show the response to the presentation of an unknown or black listed bankcard 100, as implemented in some embodiments of the invention. In FIG. 18A, Bankcard data 110, relating to bankcard 100, is received by bankcard terminal 200 in response to the presentation of bankcard 100. Bankcard terminal 200 passes on the bankcard data 110 (or data derived from it) to fare processing system 300, which makes a determination based on transit account ACL 230A, specifically by examining the list of one or more tokens 710 for the existence and status of bankcard 100. In response to determining bankcard 100 to be an unknown bankcard 810 (i.e., it is not listed in transit account ACL 230A) or to be invalid (i.e., it is listed on transit account ACL 230A as invalid), an authorization request 120 is received by bankcard verification proxy 610.

Figure 21:
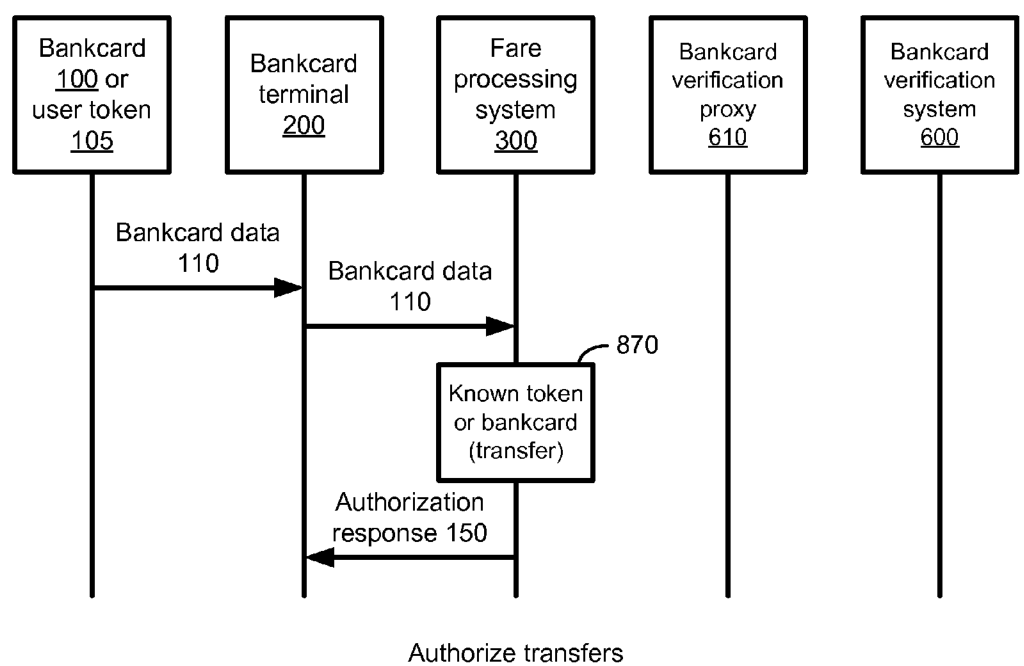
FIG. 21 shows the sequence of events making up a transfer transaction, where a plurality of rides are accounted for as a single ride.

FIG. 21 shows the sequence of events making up a transfer transaction, where a plurality of rides are accounted for as a single ride: when the rider presents their bankcard 100 or other identifying token 105, bankcard data 110 (or other identifying data indicative of the presented card or token) are transmitted to terminal 200. Terminal 200 passes the data (or data derived from it) on to fare processor 300. If fare processor 300 determines the eligibility of the ride as a transfer (e.g., by searching a historical database for transactions involving a bankcard or other identifying token associated with the same rider), an authorization 150 is immediately granted. In that process, bankcard verification proxy 610 is not required, and neither is the bankcard verification system 600—i.e. the transfer transaction occurs within the mass transit domain and not within the financial network domain.

Figure 22A:
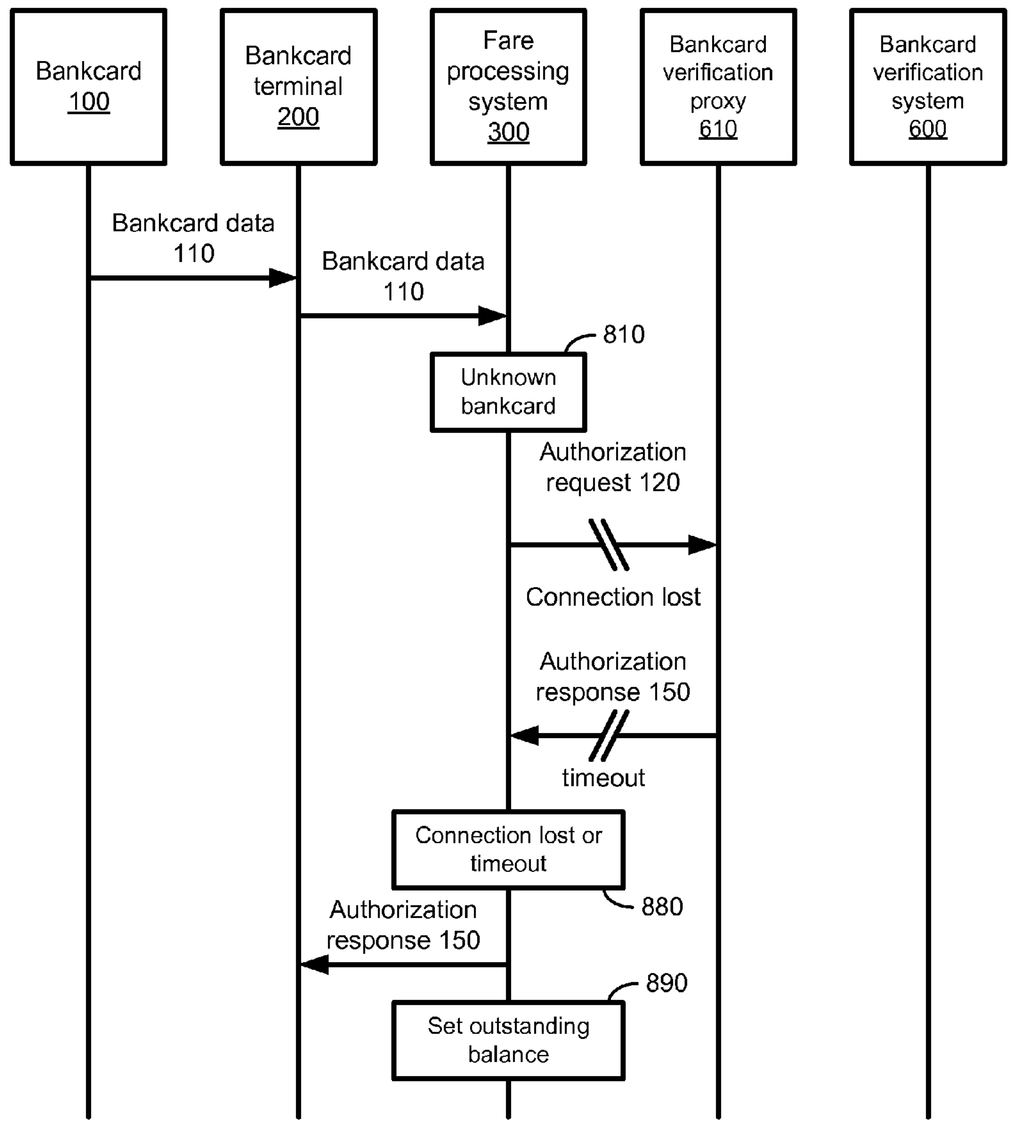
FIGS. 22A and 22B show two alternative reactions when fare processor 300 determines (880) that it cannot communicate with either the bankcard verification system 600 nor proxy 610.
Figure 22B:
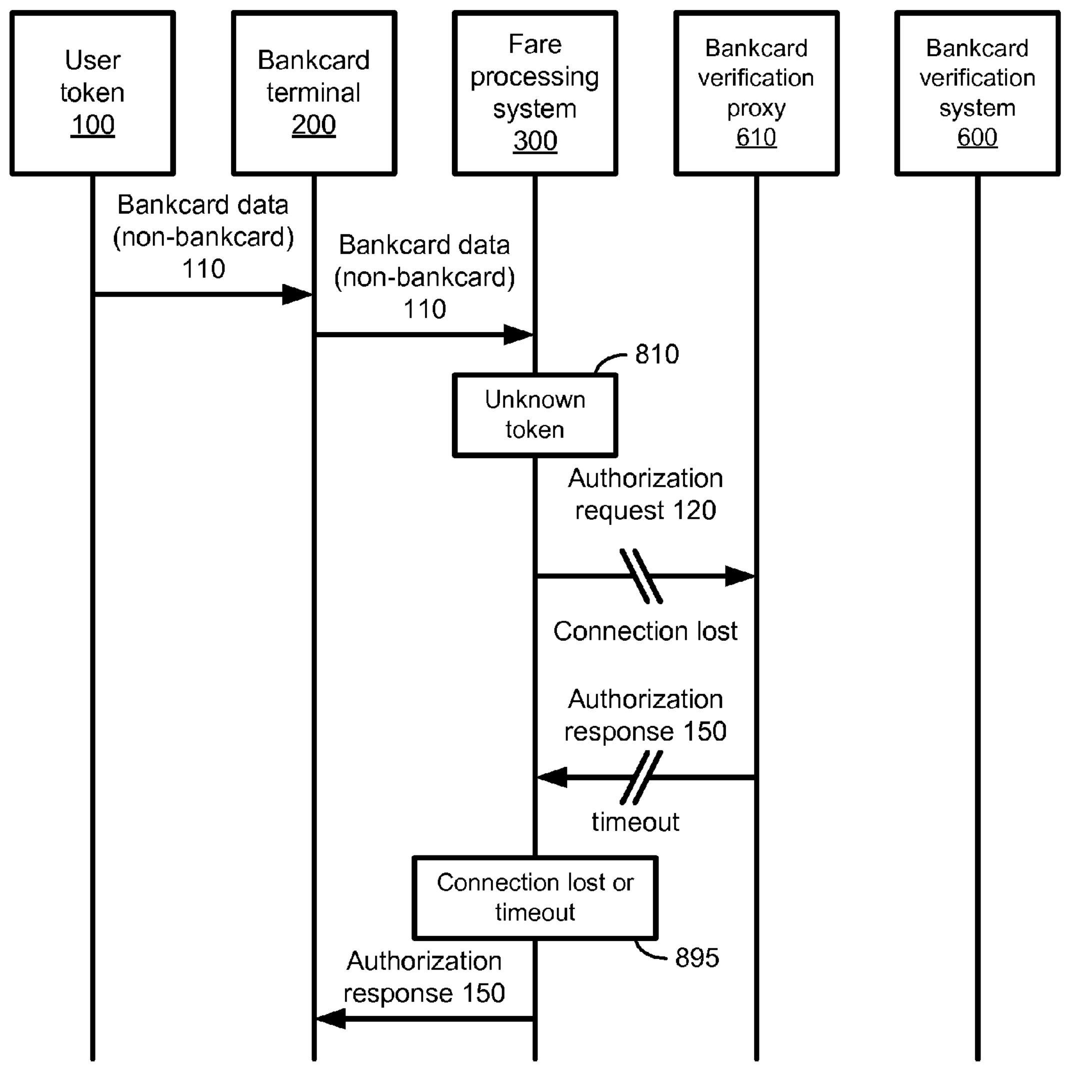

FIGS. 22A and 22B show two alternative reactions when fare processor 300 determines (880) that it cannot communicate with either the bankcard verification system 600 nor proxy 610: FIG. 22A shows an embodiment where fare processor 300 gives authorization for any card or token determined to be unknown (810) and simply accounts for it (890) in the hopes of later being able to collect. FIG. 22B shows an embodiment where all unknown cards are rejected when communications with neither bankcard verification system 600 nor proxy 610 are possible.

Figure 23A:
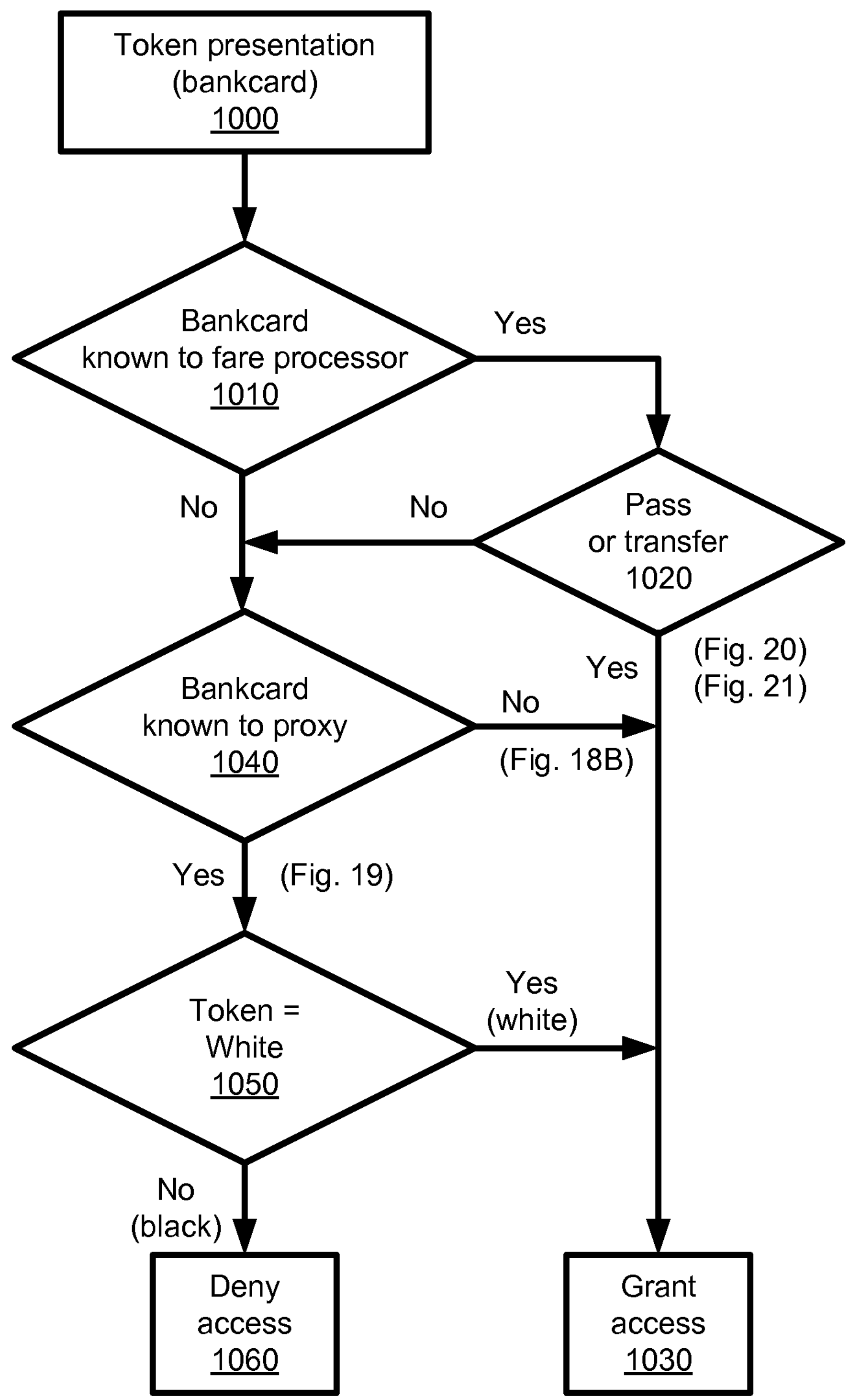
FIGS. 23A and 23B show two decision trees, implemented in some embodiments of the present invention.
Figure 23B:
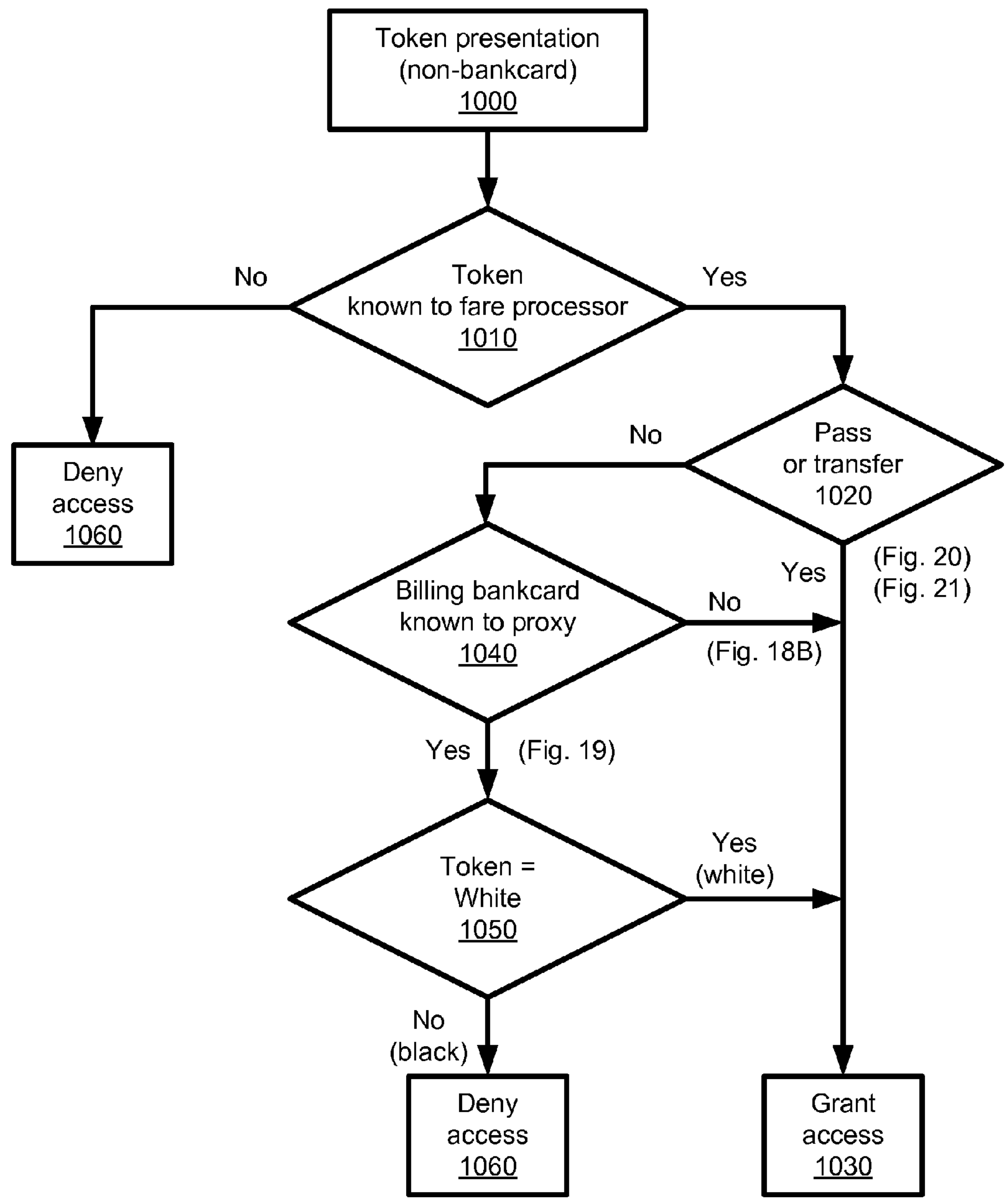

FIGS. 23A and 23B show two decision trees, implemented in some embodiments of the present invention, the distinction being that FIG. 23A is for a bankcard 100, which is not only an identification token, but also a financial instrument, whereas FIG. 23B is for identification tokens that are not a financial instrument or inherently coupled to one: in both cases, fare processor 300 determines (1010) whether it has a record of the bankcard or token, respectively. If an unknown bankcard is presented, its characteristics as a financial instrument allow for it to be established ad hoc as a known bankcard. Contrarily, an unknown identification token, results in a denial of access (1060).

Figure 24:
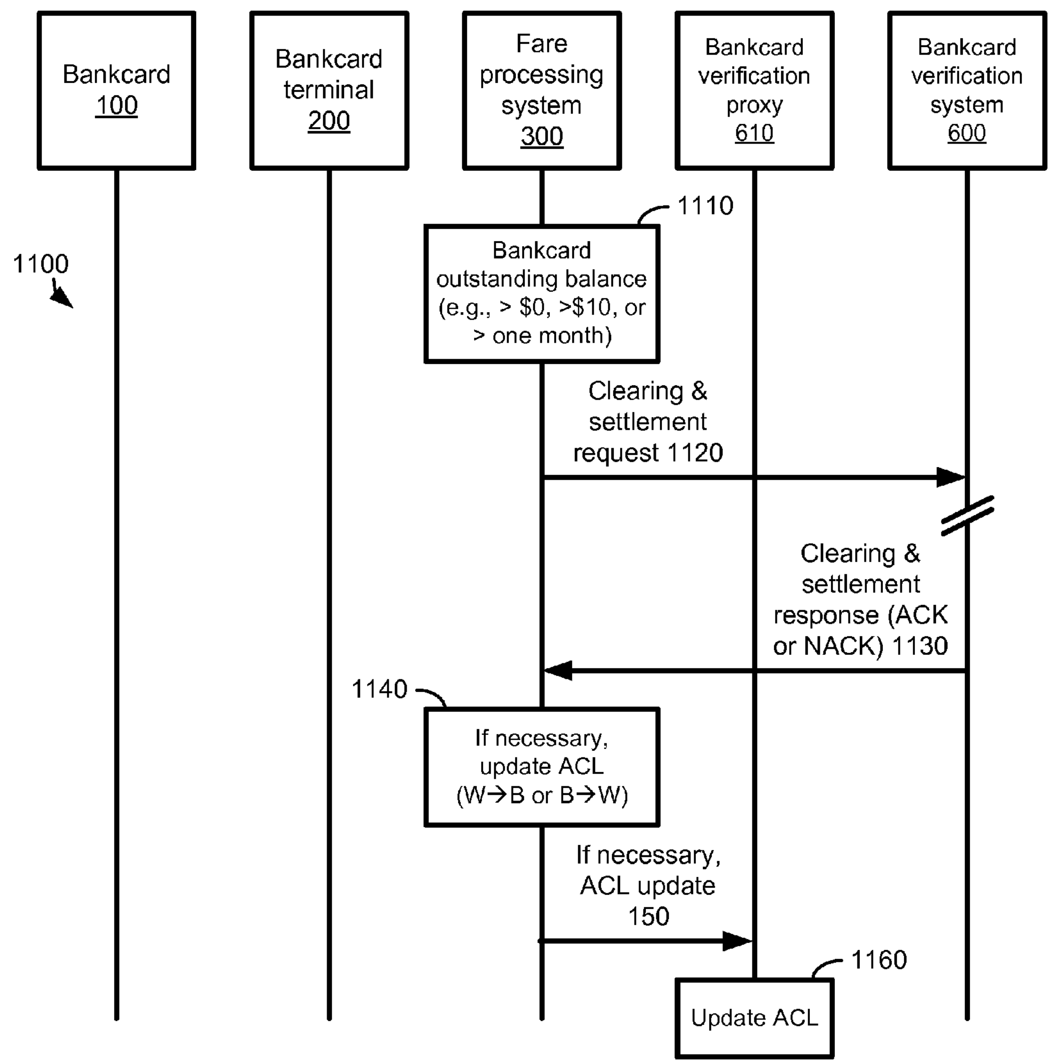
FIG. 24 shows how the fare processor 300 settles balances of transit accounts it maintains.

FIG. 24 shows how the fare processor 300 settles balances of transit accounts it maintains (a transit account, in some embodiments, can be as simple as the record of a single bankcard, but in other embodiments can encompass records of a plurality of identifying tokens and/or a plurality of records of settlement accounts): when the decision to settle (1010) is made by fare processor 300, bankcard infrastructure 600 is used to issue payment request 1020. In response to an acknowledging response 1030, fare processor 300 may change the recorded state of the account (or, in the simpler case, the card) from known invalid (e.g., due to payment overdue) to known valid. In response to an negative (NACK) response 1030, fare processor 300 may change the recorded state of the account/card from known valid to known invalid.

Figure 25:
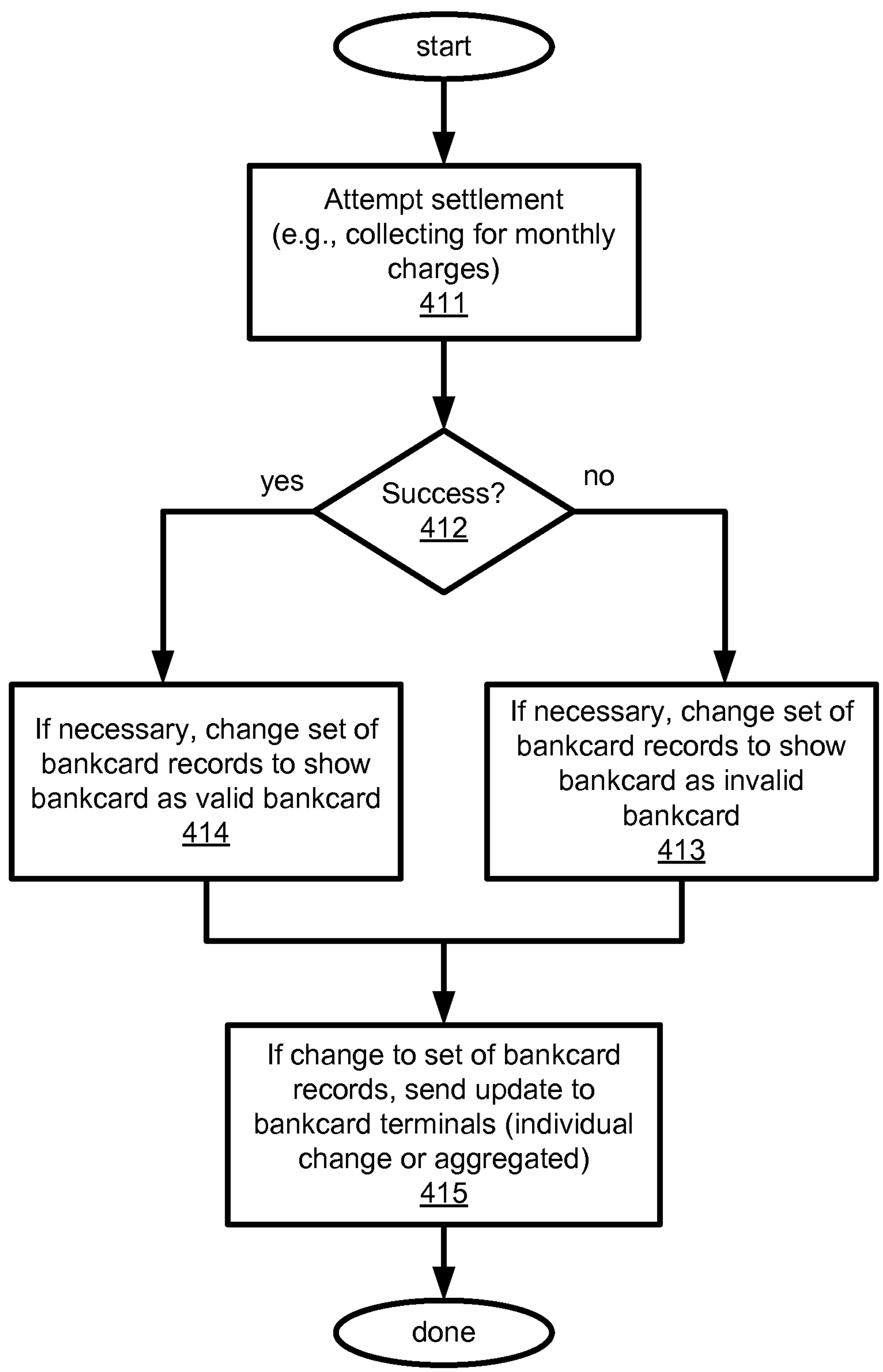
FIGS. 25 and 27 represent flowchart implementations for operations in a processing system, in accordance with embodiments of the present invention.
Figure 27:
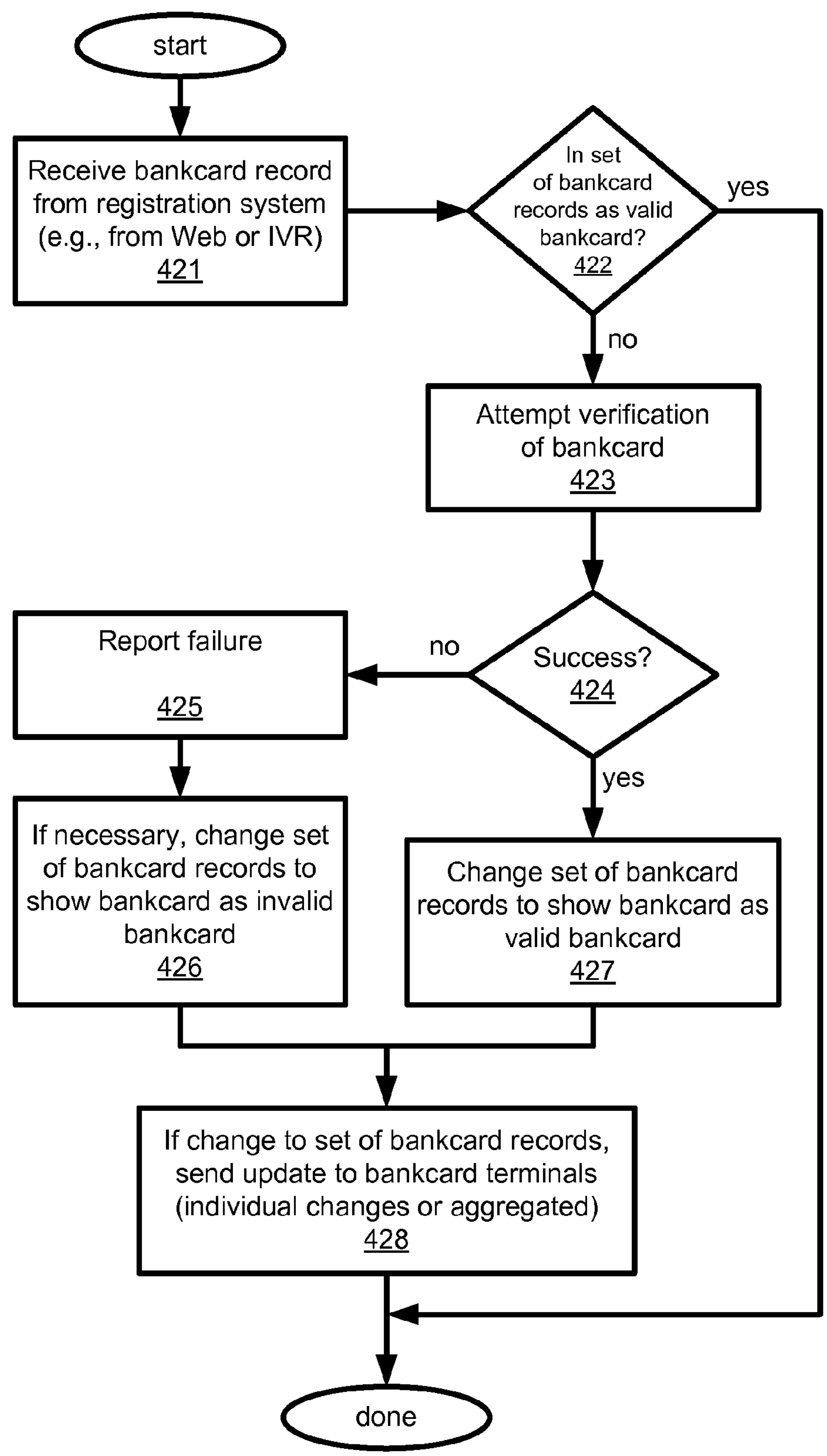

FIGS. 25 and 27 represent flowchart implementations for operations in a processing system, in accordance with embodiments of the present invention. In FIG. 25, at 411, fare processing system 300 attempts settlement, for example, to collect for monthly charges. At 412, a determination is made whether the attempt was successful. At 413, if the attempt was unsuccessful, the set of bankcard records 230 may be updated to indicate the bankcard is now invalid. At 414, if the attempt was successful, the set of bankcard records 230 may be updated to indicate the bankcard is valid. At 415, if changes are made to the set of bankcard records 230, an update may be provided to each bankcard terminal. The update may be provided as a new set of bankcard records 230 that the bankcard terminal will use as a replacement set. Alternatively, the update may be provided as incremental changes to the existing set.

Figure 26:
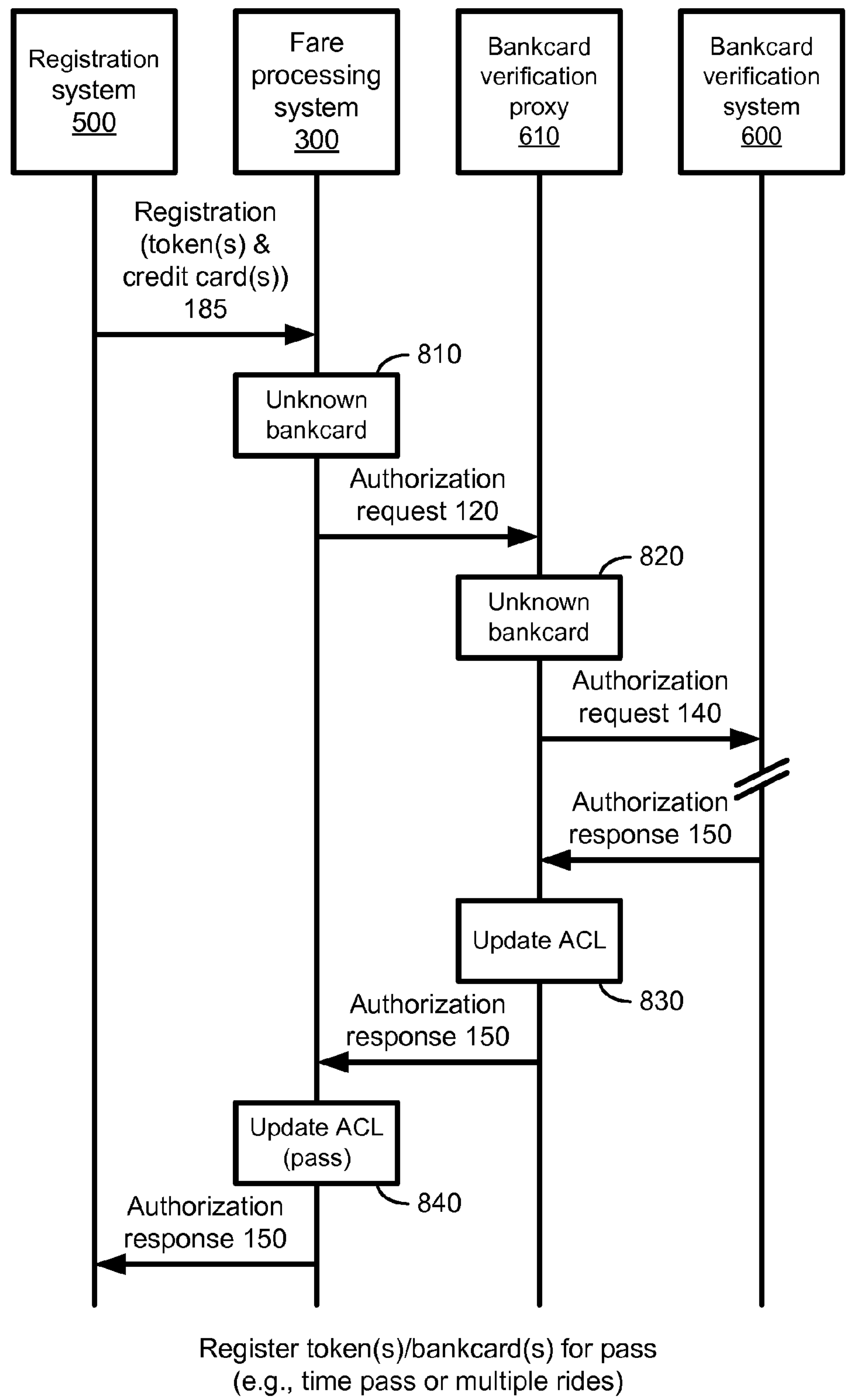
FIG. 26 illustrates the process of registering a token and payment method for a fare product.

FIG. 26 illustrates the process of registering a token and payment method for a fare product (token and payment method can be the same, as in the case of a bankcard 100, or different, e.g., an RFID fob as identification token 105 and an employee benefit account as payment method): registration system 500 (e.g, a web server, or a issuance server at a bank) transmits registration data 185 to fare processing system 300, which, in the scenario depicted, determines (810) the payment method to be, as shown here, in the case of a bankcard, an "unknown bankcard". In case of other payment methods, analogous states exist. The payment method is then validated, in the case of a bankcard, by transmitting an authorization request 120. If the bankcard verification proxy 610 also determines (820) the bankcard to be unknown, an authorization request 140 is transmitted to bankcard verification system 600, which responds with authorization response 150. In the case of positive acknowledgement (as shown), bankcard verification proxy 610 updates its records to indicate that the card is now a known card and sends an authorization response 150 to fare processor 300. In response, fare processor 300 will grant the entitlement by updating its access control lists accordingly. Optionally, authorization response 150 is forwarded to registration system to allow for feedback at registration system 500.

FIG. 27, at 421 to 428, shows a process to register bankcards with a back-end through a web interface, kiosk, telephone or other interactive system such as used by a financial institution. Through the registration process, a fare processing system 300 associated with a set of transit systems including at least one transit system maintains a set of bankcard records.

At 421, a fare processing system 300 receives, from a bankcard registration system through its third interface 350 to the registration system, a registration request. The registration request is a request by the remote bankcard holder or by a financial institution or its agent to register the bankcard with the fare processing system 300. By pre-registering the bankcard, future regulation of entry or access to any of the set of transit systems may be more quickly performed, for example, because a remote bankcard terminal 200 will not need to perform an authorization or clearing and settlement request with a distant bankcard verification or clearing and settlement system. The registration request contains bankcard data of a bankcard presented by a respective holder of the bankcard. The bankcard data may include an identifier of the bankcard such as the PAN or credit card number. Next, the fare processing system 300 determines an identifier of the presented bankcard. This determined identifier of the presented bankcard may be used as an index to a database or lookup table and may be a PAN or a credit card number or derived from the PAN or credit card number such as through a hashing function.

At 422, the fare processing system 300 determines whether the determined identifier is contained in a set of bankcard records. The set of bankcard records includes identifying information of bankcards that were previously presented to the fare processing system 300. These previously presented bankcards include bankcards from a plurality of issuers. For example, the set contains at least one bankcard from a first issuer (e.g., Chase®) and at least one bankcard from a second issuer (e.g., American Express®). The plurality of issuers may contain two or more issuers including, for example, Chase, American Express, Citi®, Bank of America®, Discover®, MasterCard®, Visa® and the like. The set contains a number of values for each bankcard including an identifier of a bankcard previously presented to the processing system. This identifier in the set may be searchable and may be used by the fare processing system 300 when determining whether the determined identifier is contained in a set of bankcard records.

At 423, the fare processing system 300 attempts to verify the bankcard through a bankcard verification system. The attempt to verify the currently presented bankcard with the bankcard verification system may include attempting to verify the currently presented bankcard with a clearing and settlement network. Alternatively, the attempt to verify the currently presented bankcard with the bankcard verification system may include receiving an authorization, from a clearing and settlement network, for an amount of funds from an account linked to the currently presented bankcard. In some circumstances, the attempt to verify the currently presented bankcard with the bankcard verification system may result in a failed attempt. For example, the attempt to verify the currently presented bankcard with the bankcard verification system may result in receiving, from the bankcard verification system, an indication that the bankcard verification system rejects the authorization of a financial charge.

By verifying the bankcard, the fare processing system 300 determines whether the bankcard will be eligible or ineligible for a future purchase. At 424, if the verification is not successful, the fare processing system 300 reports this failure at 425. That is, the fare processing system 300 reports a failure, if attempting to verify the presented bankcard results in a determination of an invalid bankcard. At 426, if the set contains invalid or ineligible bankcards, the fare processing system 300 changes the set to show that the bankcard is an invalid bankcard. That is, the fare processing system 300 removes, from the set of bankcard records, the present bankcard, if attempting to verify the presented bankcard results in the determination of an invalid bankcard. At 424, if the verification is successful, the fare processing system 300 changes the set to show that the bankcard is a valid bankcard at 427. That is, the fare processing system 300 incorporates the presented bankcard into the set of bankcard records, if attempting to verify the presented bankcard with the bankcard verification system results in receiving an indication of a valid bankcard.

In either case at 428, if the fare processing system 300 made a change to the set of bankcard records, it will communicate, to at least one bankcard terminal 200, updates to the set of bankcard records. The updates may be made either individual for each received bankcard record or may be aggregated as a batch update. The update may be downloaded to a bankcard terminal 200 by an electronic data connection or may be made by physically porting a memory device (e.g., a CD-ROM or flash drive) from the fare processing system 300 to the bankcard terminals 200.

In some embodiments, the set of bankcard records 230 contains only bankcards presented to the system at the front-end through bankcard terminal. In other embodiments, the set of bankcard records 230 contains only bankcards presented to the system at the back-end through a registration system. Still in other embodiments, the set of bankcard records 230 contains only bankcards presented to the system at either the front-end or the back-end. In some embodiments, the set of bankcard records 230 contains only bankcards individually by a holder of the bankcard. In some embodiments, the set of bankcard records 230 contains only bankcards individually by a holder or holder's agent of the bankcard. In a sense, each of the presentations is learned by the system. In some embodiments, the set of bankcard records 230 includes bankcards presented by a financial institution, or the like, in addition to the learned bankcards.

A rules processor may be used to process bankcard records or user token data. These presentations may be processed offsite in real-time or offline individually or accumulated and processed in a batch mode. In some embodiments, a bankcard is either a debit card or a credit card. In other embodiments, a user token or identifying toke is used. An identifying token may be a bankcard or other payment card or other identification (ID) card or chip in the form of a card or embedded in or on another device such as a mobile phone.

When bankcard presentations are processed offline (not in real-time), resulting user toke records, each representing a presentation, may be received by a rules processor in non-sequential order. That is, records may be received out of order and perhaps some records may be delayed by a substantial period of time.

Figure 28:
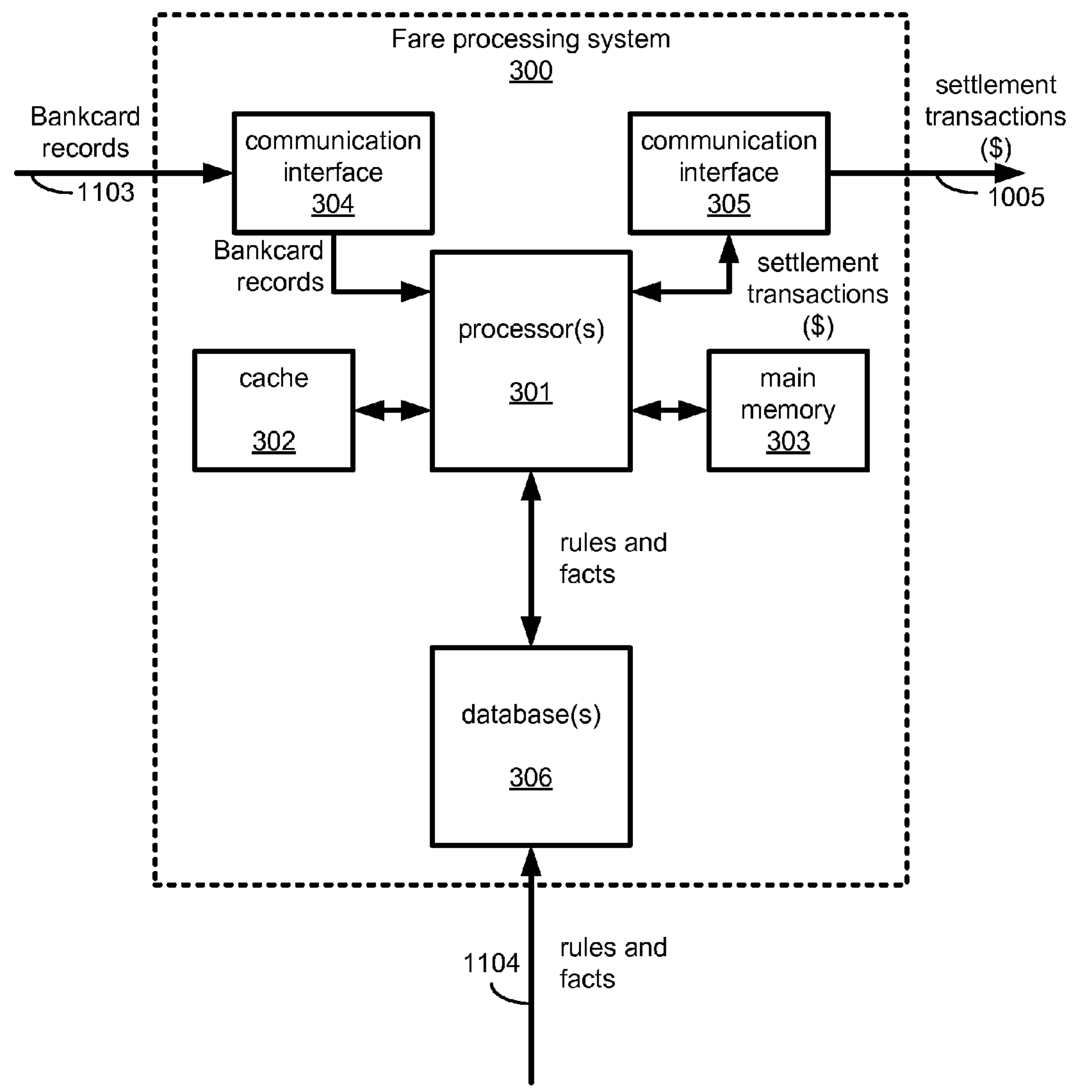
FIG. 28 shows additional detail of a presentation record processor (rules processor), in accordance with embodiments of the present invention.

FIG. 28 shows additional detail of a presentation record processor (rules processor) 300, in accordance with embodiments of the present invention. The fare processing system 300 may comprise a processor 301 coupled a first interface (communication interface 304, which may be a TCP/IP interface, a socket or a computer bus) to accept user token records 1103 and a second interface (communication interface 305, which may similarly be a TCP/IP interface, a socket or a computer bus) to send settlement transaction data 1005. The processor 301 is also coupled to a cache 302, a main memory 303 and one or more databases 306. Two or more of the components described in FIG. 28 may be incorporated in to an integrated device.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A method for controlling access to a transit network by maintaining a black list of identifying tokens, the method comprising:

granting a potential rider access to a transit system upon presentation of an identifying token, comprising:
reading a first set of token data from a first identifying token using a token reader;
computing a first token identifier from token data;
checking a first token against a black list in memory, using the first token identifier; and
allowing access to the transit network, if the first token is not black listed;

denying a potential rider access to the transit system upon presentation of an identifying token, comprising
reading a second set of token data from a second identifying token, using a token reader;
computing a second token identifier from the token data;
checking the second token identifier against the black list in memory, using the second token identifier; and
denying access to the transit network, if the second token is black listed;

removing a third identifying token from the black list after its outstanding balance is paid, comprising:
successfully charging a payment account associated with the third identifying token; and
removing the third identifying token from the black list; and adding a fourth identifying token to the black list if the outstanding balance remains unpaid, comprising:
unsuccessfully charging one or more a payment accounts associated with the fourth identifying token; and
adding the fourth identifying token to the black list.

2. The method of claim 1, wherein the act of computing a token identifier from the token data comprises applying of a hash function.

3. The method of claim 1, wherein at least one of the first identifying token, second identifying token and third identifying token is a bankcard.

4. The method of claim 1, wherein the token data is bankcard data.

5. The method of claim 1, wherein the act of computing a token identifier from the token data comprises extraction of a Primary Account Identifier.

6. The method of claim 1, wherein the black list is a uniquely identifiable subset of a larger set of identification token data.

* * * * *